United States Patent [19]

Mentler

[11] Patent Number: 5,162,982

[45] Date of Patent: Nov. 10, 1992

[54] POWER CONVERTER CONTINUOUSLY OPERABLE THROUGH BOOST AND BUCK MODES

[75] Inventor: Sandor Mentler, Hamilton Square, N.J.

[73] Assignee: General Electric Company, N.Y.

[21] Appl. No.: 707,729

[22] Filed: May 30, 1991

[51] Int. Cl.⁵ .......................................... H02M 3/335
[52] U.S. Cl. ...................................... 363/26; 363/134
[58] Field of Search ................... 363/24, 25, 26, 97, 363/133, 134

[56] References Cited

U.S. PATENT DOCUMENTS

| | | | |
|---|---|---|---|
| 3,559,051 | 1/1971 | Vigna | 363/24 |
| 4,245,286 | 1/1981 | Paulkovich et al. | 363/21 |
| 4,674,019 | 6/1987 | Martinelli | 363/24 |
| 4,688,165 | 8/1987 | Pruitt | 363/132 |
| 4,691,270 | 9/1987 | Pruitt | 363/56 |
| 4,709,323 | 11/1987 | Lien | 363/134 |
| 4,729,088 | 3/1988 | Wong | 363/26 |

*Primary Examiner*—Jeffrey L. Sterrett

[57] ABSTRACT

A DC-to-AC power inverter includes a transformer with a secondary winding and a center-tapped primary. The center tap is connected to one pole of the DC source, and each end of the primary winding is connected to the other pole of the source by a switch. The switches are controlled in a 50% duty cycle mode, a mode in which both switches are ON simultaneously, and/or a mode in which both switches are periodically OFF simultaneously. The both-ON switch condition short-circuits the transformer, with the result that more current flows through the inductor, which has the effect of boosting transformed voltage above that of the 50% duty cycle mode. The both-OFF mode reduces the inductor current and decreases the transformed voltage. The amount of overlap of the both-ON and both-OFF conditions controls the output voltage. A rectifier arrangement may be coupled to the secondary winding to convert the AC output voltage to DC. A particular embodiment of invention includes snubbers associated with the switches, a coupled-inductor arrangement connected between the primary windings and the center tap, and an inductor in series with each primary winding.

26 Claims, 14 Drawing Sheets

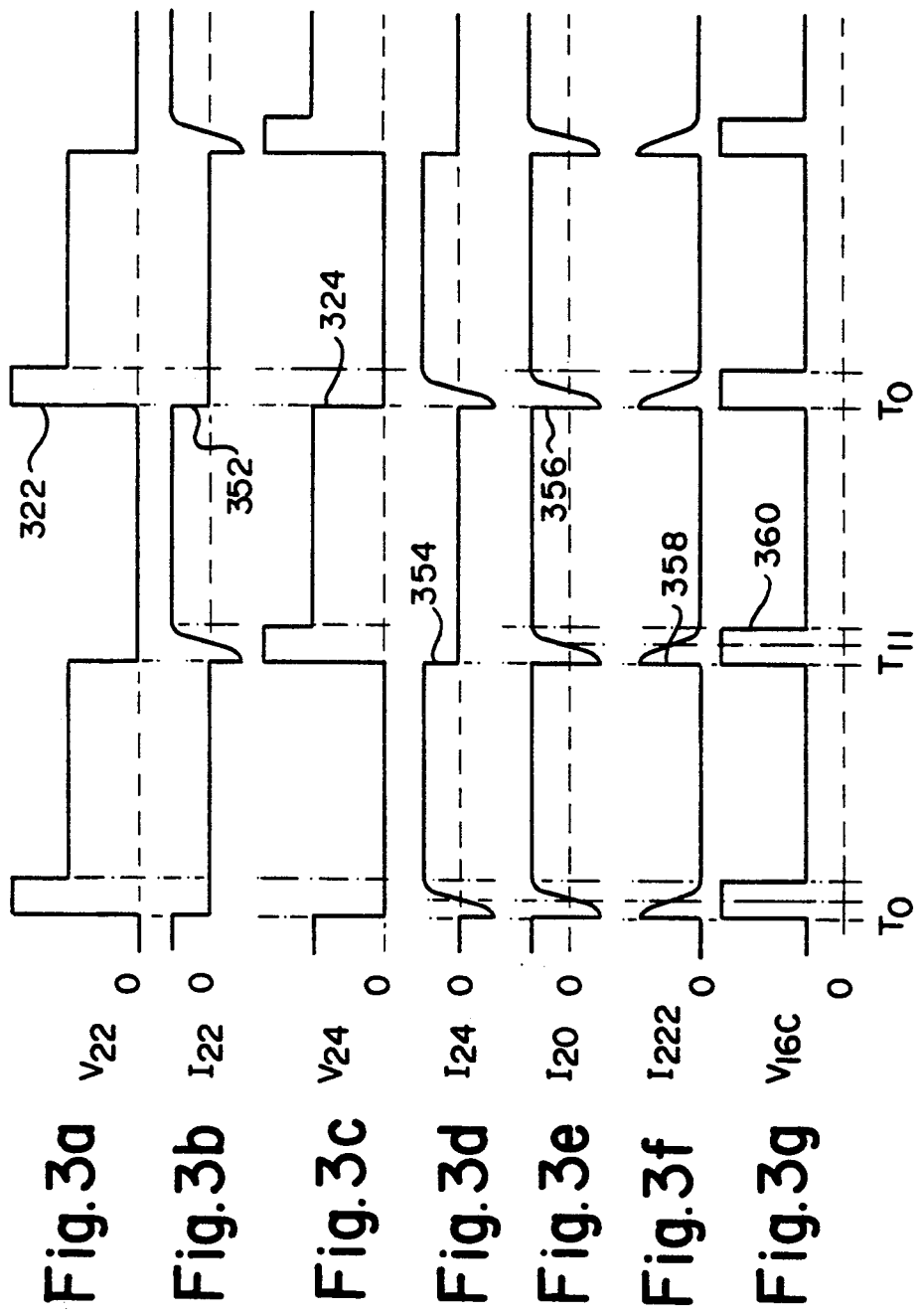

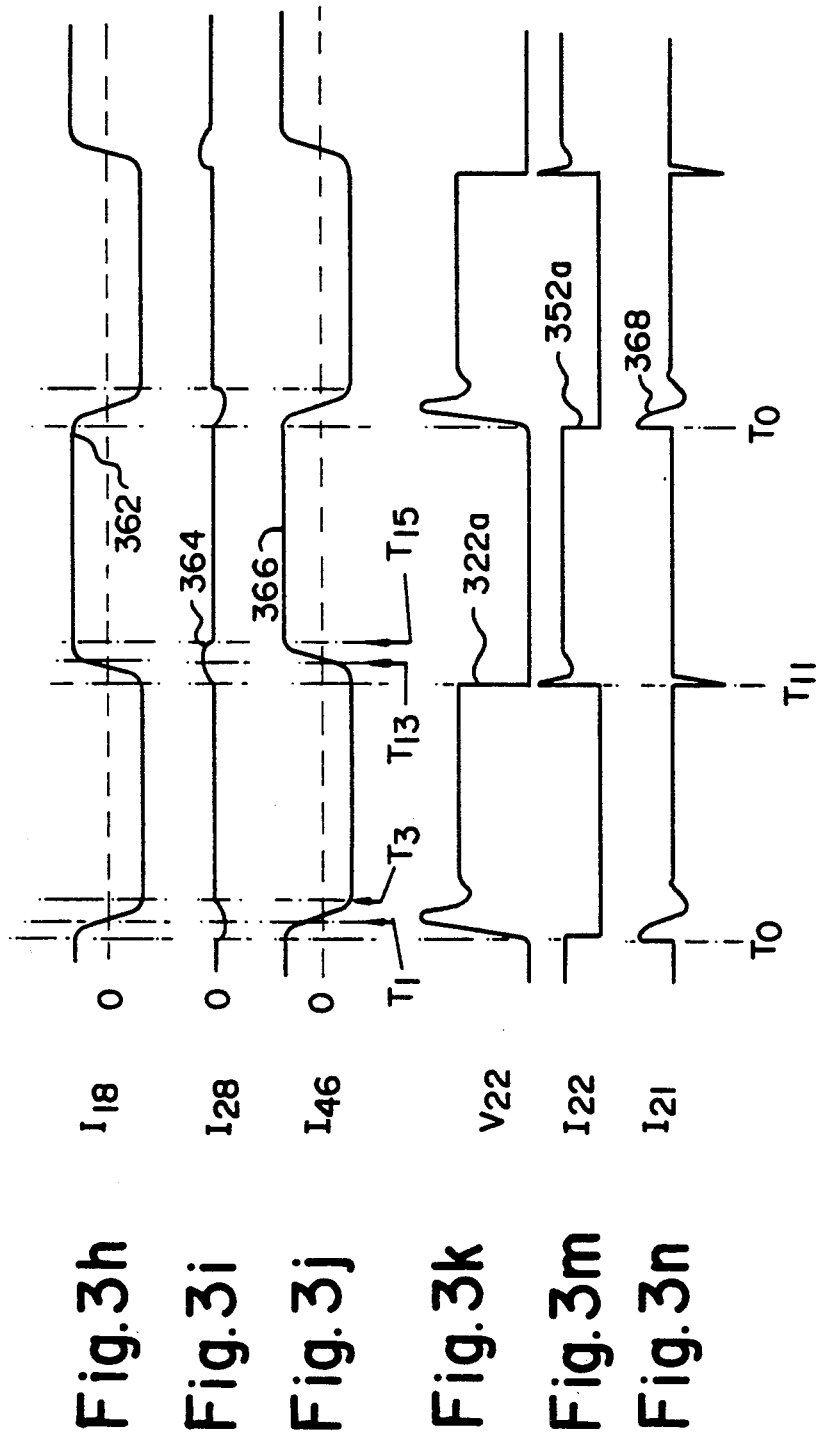

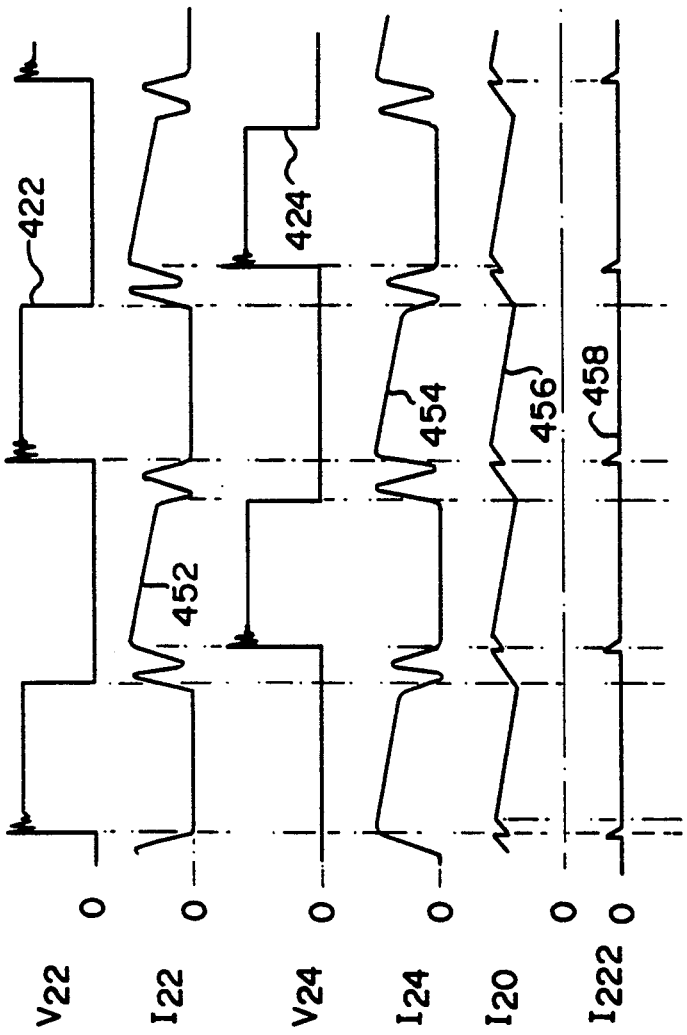

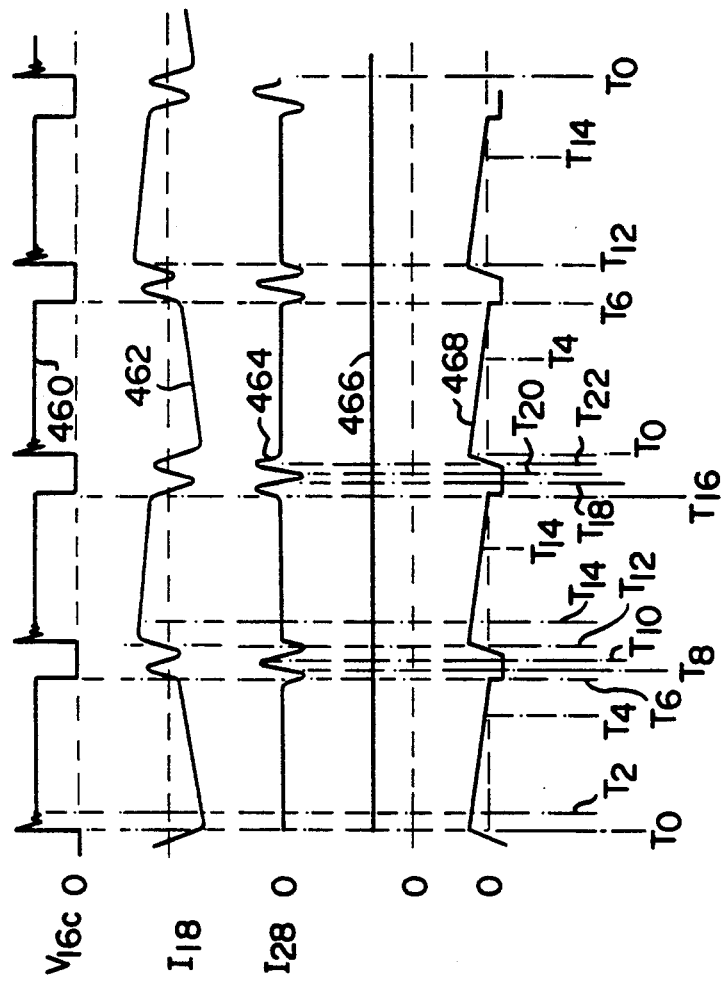

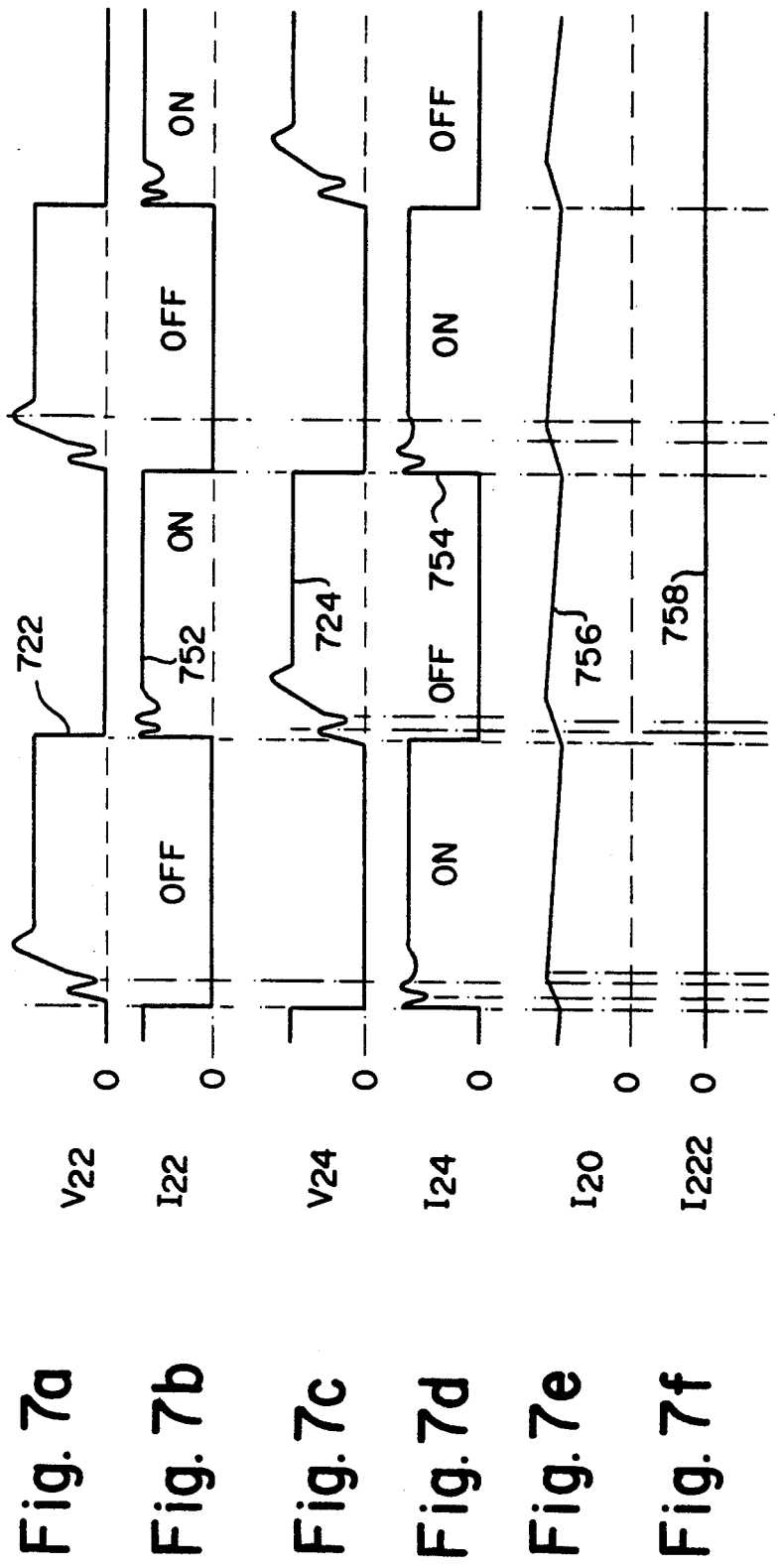

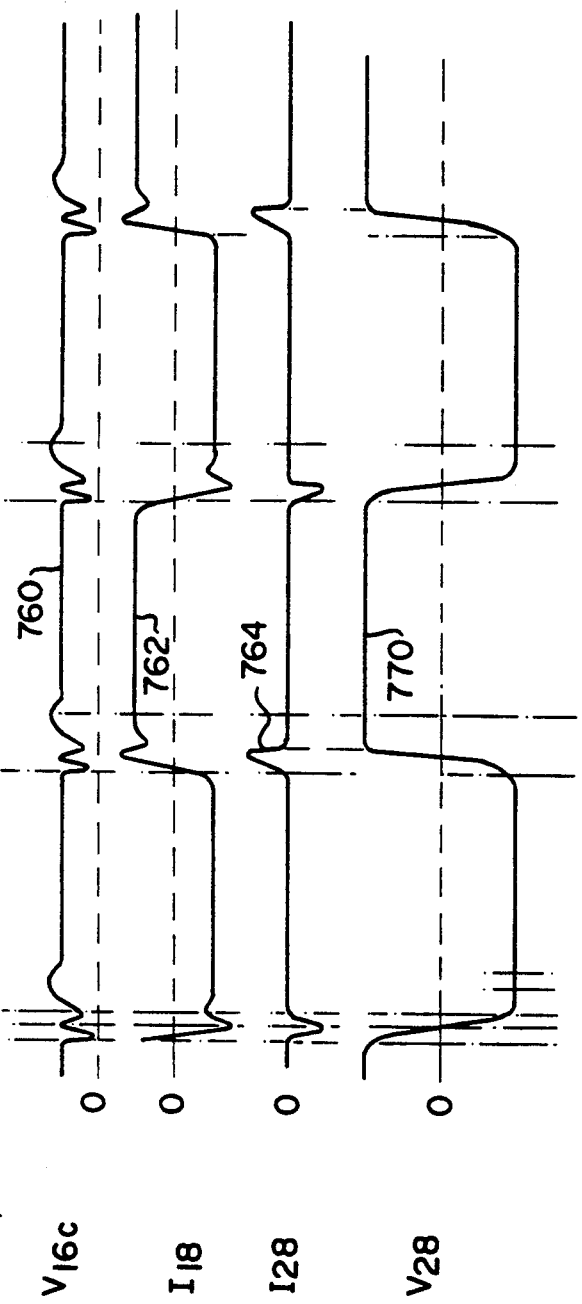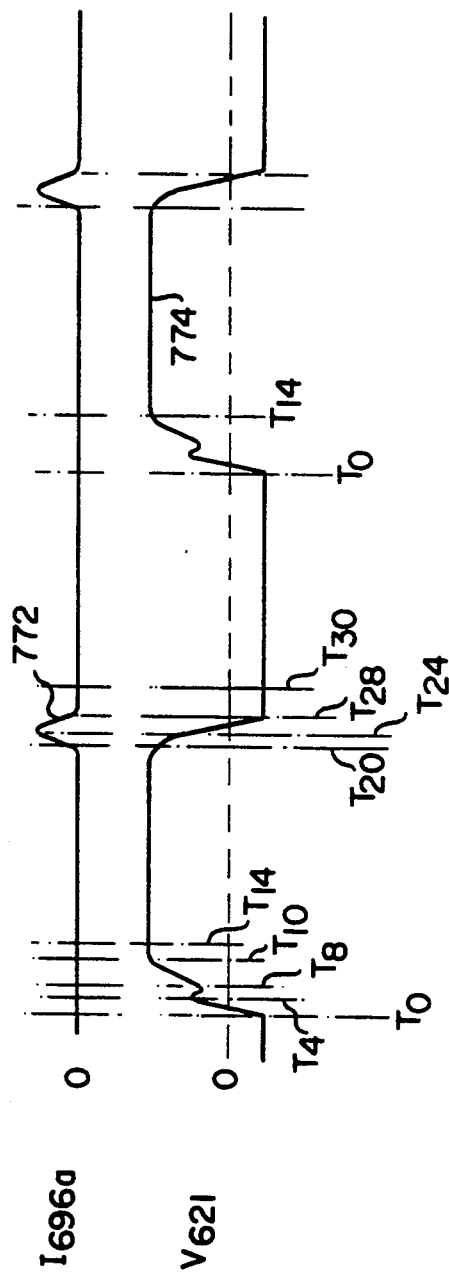
Fig. 7g
Fig. 7h
Fig. 7i
Fig. 7j
Fig. 7k
Fig. 7m

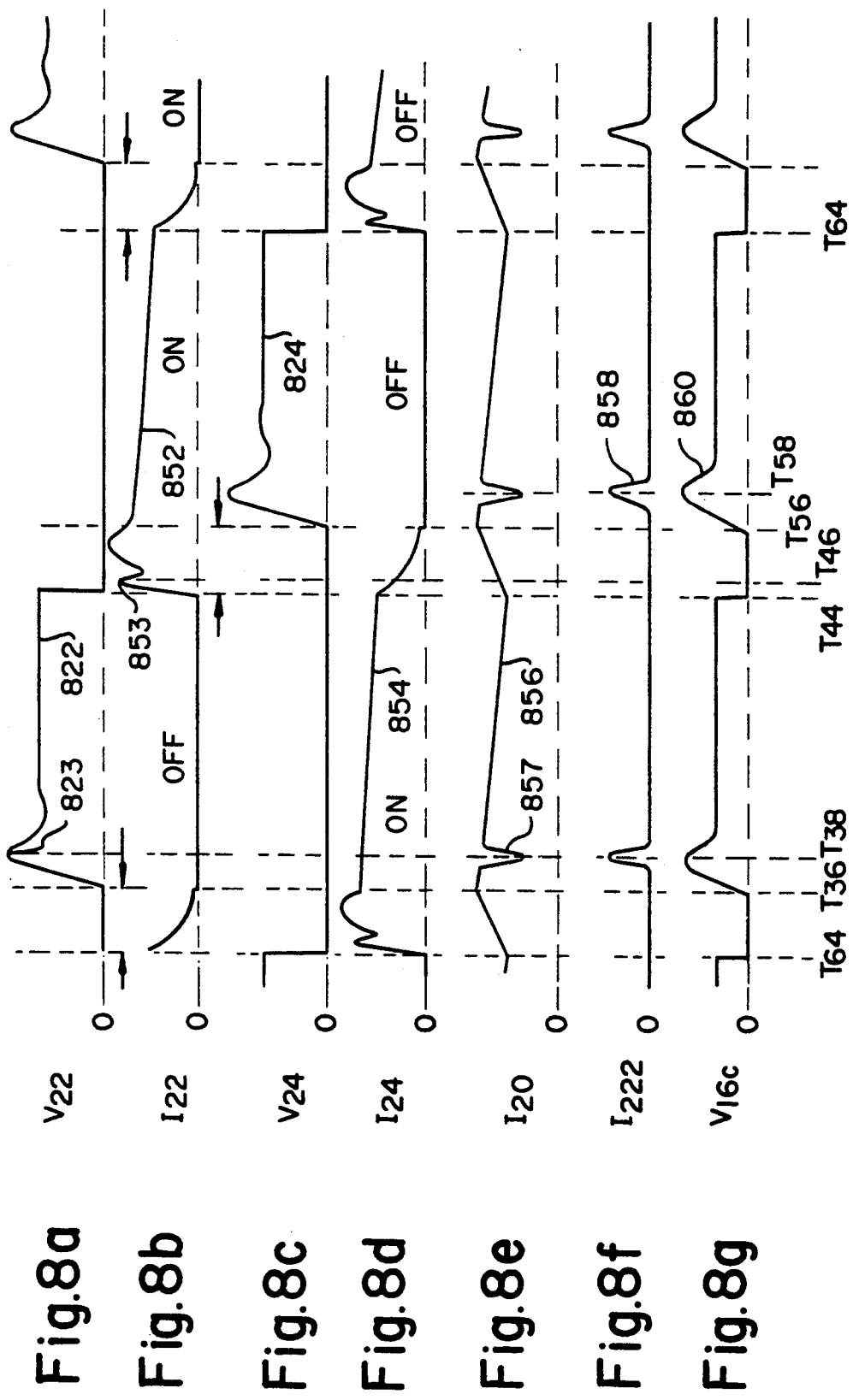

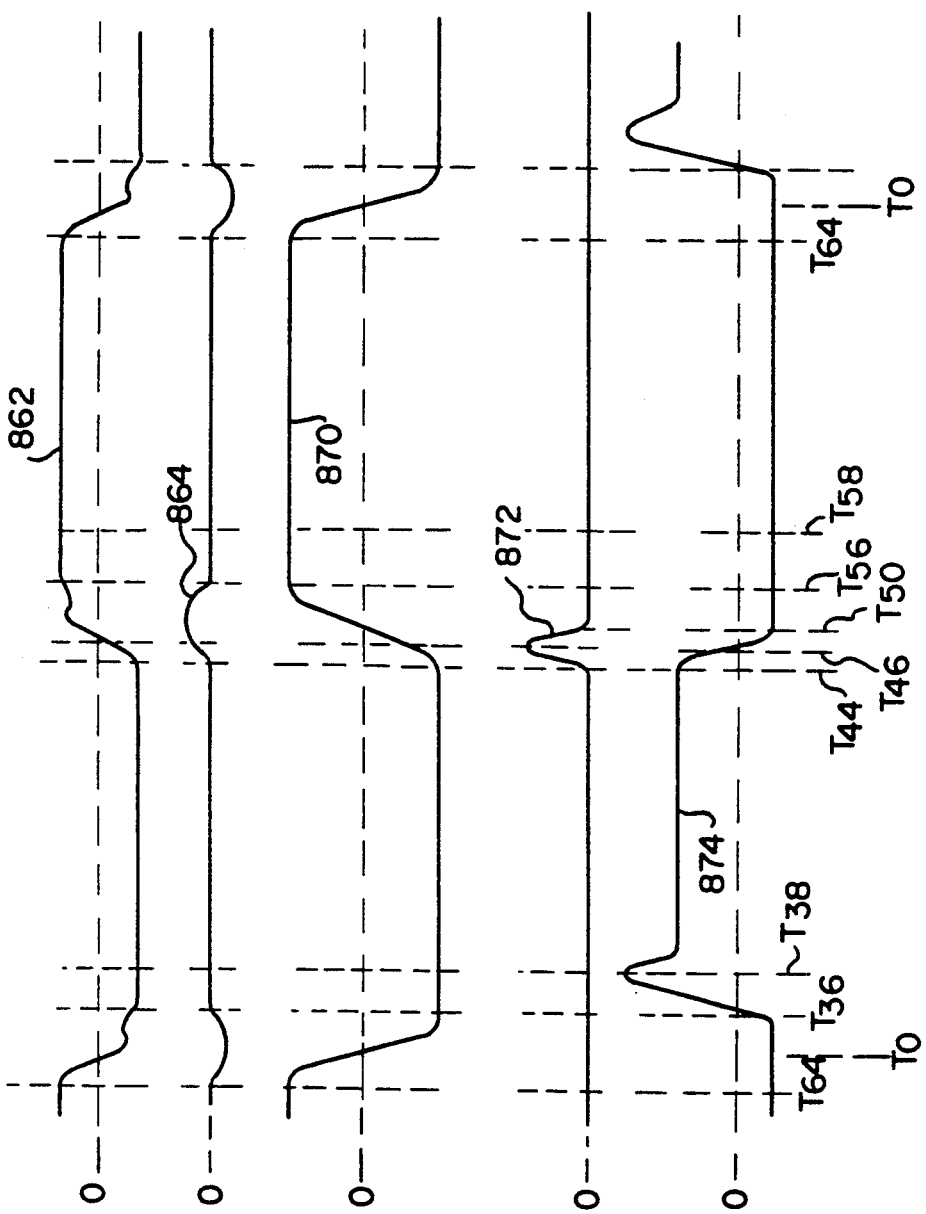

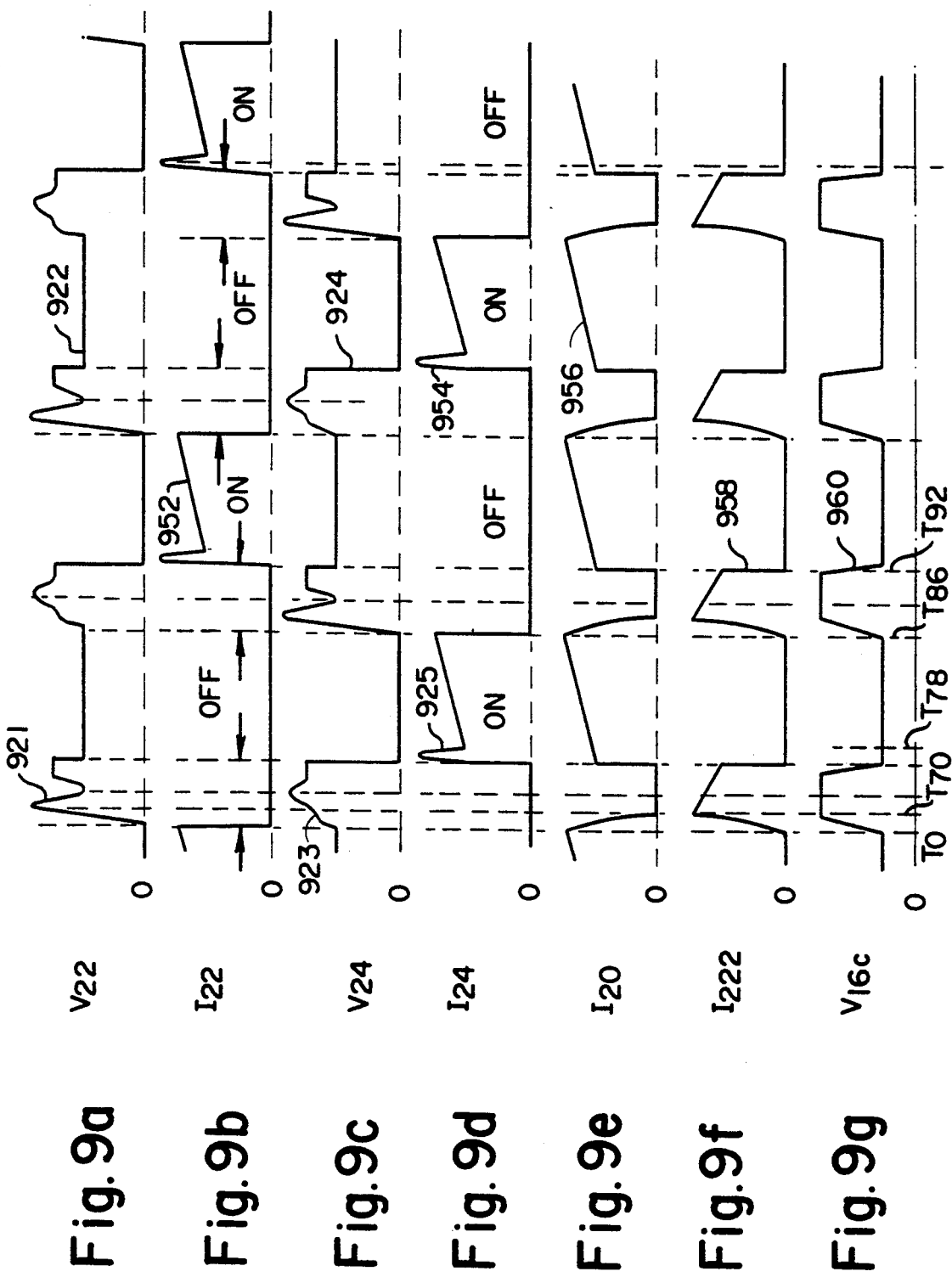

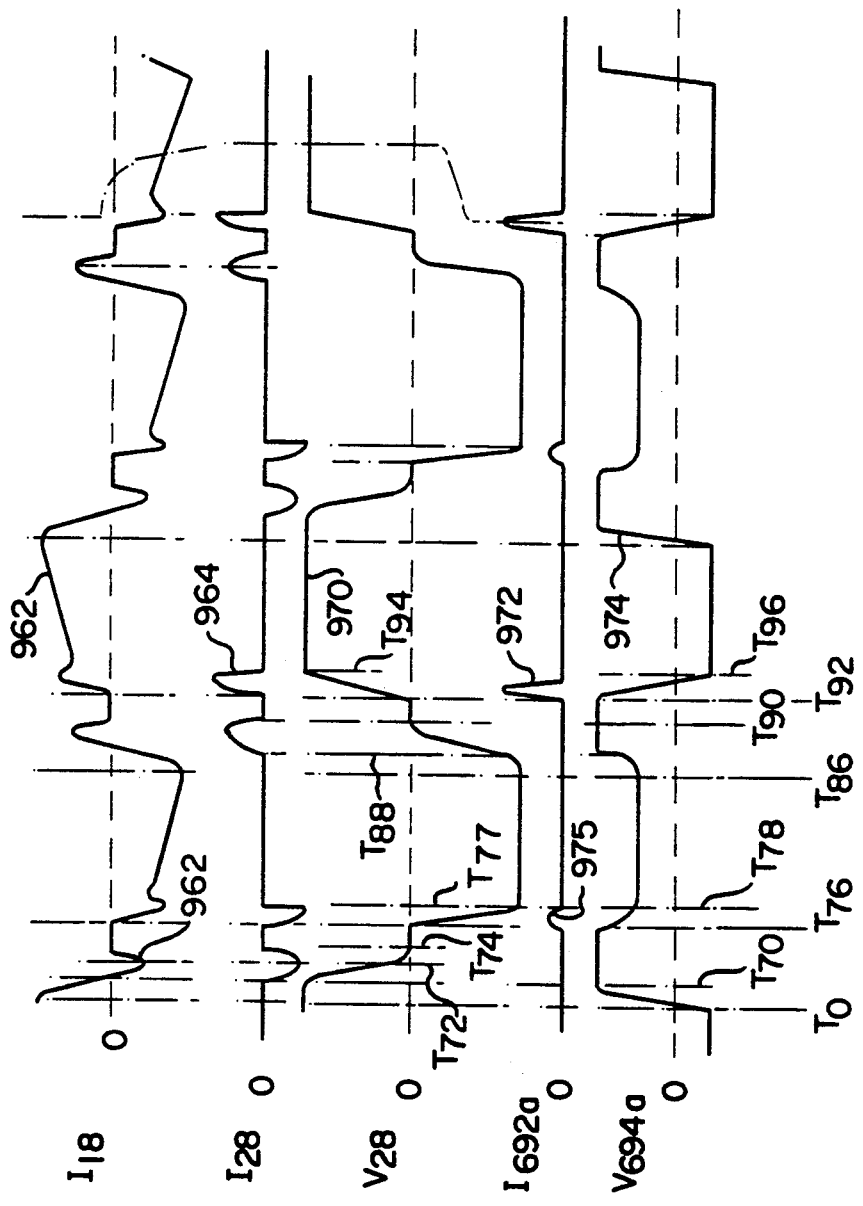

POWER CONVERTER CONTINUOUSLY OPERABLE THROUGH BOOST AND BUCK MODES

BACKGROUND OF THE INVENTION

This invention relates to DC-to-AC power inverters and DC-to-DC power converters in which operation may range continuously through boost and buck operating modes in response to different combinations of input and output voltage or current.

Applications such as those found in spacecraft require that DC power converters for converting battery voltage to a bus or load operating voltage be light in weight, highly reliable, and highly efficient. Innumerable schemes for power conversion are known, their very number being such as to make a decision as to the best operating system difficult to determine. Among the problems associated with spacecraft operation are wide variability in the direct voltage available because of variations in generation by solar cells, and wide variation in the electrical load which is to be supplied. Further problems include the relatively small amount of energy which is available from solar cells, batteries and the like, which may range from a few hundred to a few thousand watts at the current state of the art, and the difficulty of rejecting heat, which requires high efficiency to reduce heat generation.

SUMMARY OF THE INVENTION

A power converter converts a direct voltage to an alternating voltage. The power converter includes a transformer with a center-tapped primary winding and a secondary winding. A first inductance arrangement is coupled from the center tap to a first pole of the source of direct voltage. First and second controllable switches are coupled to the ends of the two halves of the center-tapped primary winding remote from the tap, and to the other pole of the source of direct voltage. During those intervals in which one or the other of the switches is conductive, current flows through the first inductance arrangement and one-half of the primary winding to produce voltage across the secondary winding. During those intervals when both switches are nonconductive, the current flow through the inductance arrangement is substantially zero, and the current flow in the primary winding is that due to resonant networks. During those intervals when both switches are conductive, the primary winding is short-circuited, whereby the entire direct voltage is applied across the inductance arrangement. A capacitance and a second inductance are serially coupled to form a series circuit, and the series circuit is coupled across the secondary winding to provide a path for the flow of current. As a result of the flow of alternating current through the series circuit, a voltage is generated across the capacitance which represents the alternating output voltage of the inverter. A rectifying arrangement may be coupled to the capacitance for rectifying the alternating voltage to produce a direct output voltage, whereupon the apparatus is a DC-to-DC converter. A control arrangement is coupled to the switches for cyclically operating the switches in one of first, second and third modes of operation. During each cycle of operation, each switch has a conductive period and a nonconductive period. In the first mode of operation, the conductive and nonconductive periods of each switch are of equal duration, whereby the first and second switches alternate their conductive states, and current flows continuously through the first inductance arrangement. In the second mode of operation, the conductive periods of both switches are of greater duration than the nonconductive periods, whereby periods of nonconduction of each of the switches alternate with periods of conduction of both switches which short-circuit the primary winding to thereby tend to increase the current flow through the first inductance arrangement. The increased current results in an alternating voltage produced across a secondary winding which tends to be greater than that in the first mode of operation, for the same direct input voltage. In the third mode of operation, the nonconductive periods of each switch are of greater duration than the conductive periods, whereby periods of conduction of each of the first and second switches alternate with periods of nonconduction of both switches, which open-circuit the primary winding to thereby tend to decrease the current flow through the first inductance arrangement. The reduced current results in a reduced voltage across the secondary winding for the same direct voltage input. In a particular embodiment of the invention, a rectifying arrangement such as a bridge circuit is coupled across the capacitor for rectifying the alternating voltage to produce direct output voltage. In another embodiment of the invention, either the second inductance or the second capacitance, or both, are leakage or stray reactances. In an embodiment of the invention, the output voltage can be varied or adjusted by controlling the operating frequency or repetition rate in the second or third operating modes.

DESCRIPTION OF THE DRAWING

FIGS. 3a-3n and 4a-4k are idealized plots of voltage or current versus time at various locations in the arrangements of FIGS. 1 or 2 in various modes of operation, FIGS. 3a-3n and 4a-4k are together referred to as FIGS. 3 and 4, respectively;

FIGS. 7a through 7m, 8a through 8m, and 9a through 9m are plots of voltage and current which occur in the arrangement of FIG. 6 in the 50% duty cycle, boost and buck modes, respectively.

DESCRIPTION OF THE INVENTION

Figure 1:
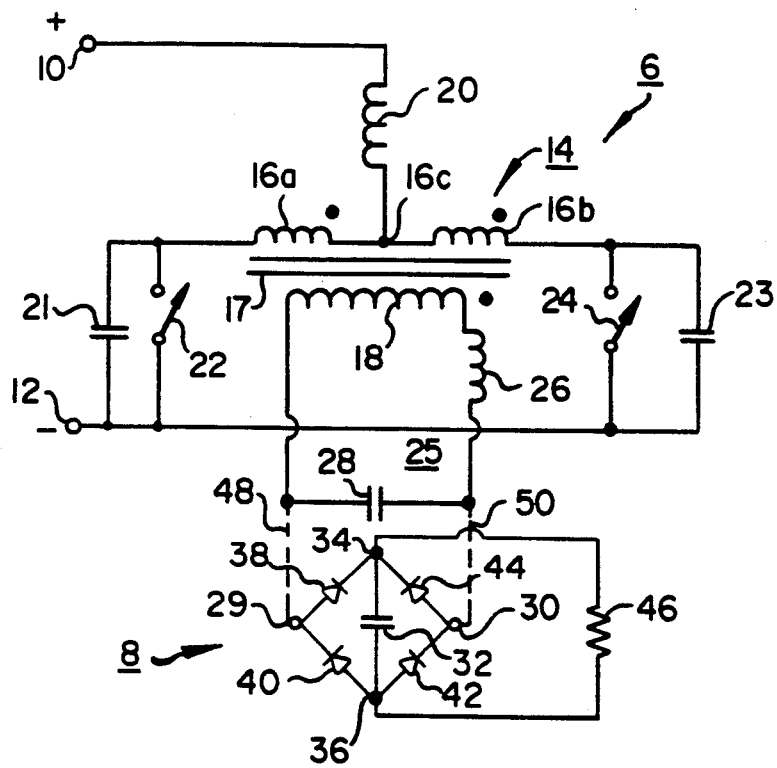
FIG. 1 is a simplified schematic diagram of a DC-to-AC power inverter in accordance with the invention, with additional circuitry illustrated for forming a DC-to-DC converter.

In general, power converters according to the invention are capable of high efficiency by virtue of the use of resonant networks, which may include parasitic reactances, and also achieve low weight and high reliability by the use of only two semiconductor switches. In FIG. 1, positive (+) and negative (−) terminals or poles 10 and 12, respectively, of a source of direct voltage (not illustrated) are connected to a DC-to-AC power inverter designated generally as 6. Inverter 6 includes a transformer designated generally as 14, which in turn includes a primary winding including portions 16a and 16b with a tap 16c therebetween, and which also includes a secondary winding 18 coupled by a magnetic core 17 to the primary winding.

An inductor 20 of FIG. 1 connects positive pole 10 to center tap 16c. A controllable switch 22 illustrated by a mechanical switch symbol connects the end of primary winding portion 16a remote from center tap 16c to negative pole 12. A capacitance 21 represents the inherent capacitance of switch 22, or the combination of the inherent capacitance supplemented by an actual capacitor. Similarly, a controllable switch 24 connects the end of primary winding 16b remote from center tap 16c to pole 12, and 23 represents the inherent capacitance of switch 24, which may be supplemented by an actual capacitor. Thus, switches 22 and 24 may be considered to be the "ideal" portion of switches which actually include capacitance. Those skilled in the art know that controllable switches such as 22 and 24 are desirably implemented as solid-state devices such as bipolar or field-effect transistors. Such transistors, when used as switches, may undesirably dissipate power during turn-ON or turn-OFF if significant current flows while a voltage appears thereacross, which reduces efficiency.

Secondary winding 18 of FIG. 1 is connected to a series circuit, designated generally as 25, which includes an inductance 26 serially coupled with a capacitance 28. While inductance 26 and capacitance 28 may be distributed through transformer 14, a physical inductor and capacitor may also be used. As described below, operation of switches 22 and 24 results in generation of an alternating voltage across secondary winding 18, which in turn generates an alternating current flow through series circuit 25. The alternating current flow in turn generates an alternating voltage across capacitor 28 which is the desired alternating output voltage of DC-to-AC inverter 6.

As so far described, inverter 6 of FIG. 1 converts direct voltage appearing at poles 10 and 12 to alternating voltage across capacitor 28. Those skilled in the art know that connection of a rectifying arrangement such as that designated generally as 8 in FIG. 1 can convert the alternating voltage at the output of inverter 6 into a direct voltage, whereby the structure of FIG. 1 is a DC-to-DC converter. In FIG. 1, rectifying arrangement 8 includes a bridge circuit with nodes 29 and 30 which are adapted to be connected across capacitor 28, as suggested by dash connection lines 48 and 50. Rectifying arrangement 8 also includes a pair of output terminals 34 and 36 across which a load may be connected, as suggested by resistance 46. The cathodes of rectifier diodes 38 and 44 are connected to output terminal 34, and their anodes are connected to input terminals 29 and 30, respectively. The anodes of rectifier diodes 40 and 42 are connected to output terminal 36 of rectifying arrangement 8, and their cathodes are connected to input terminals 29 and 30, respectively. The alternating voltage appearing across capacitor 28 alternately forward-biases diode pairs 38, 42; 40, 44 to thereby create a pulsatory current. A capacitor 32 is connected between output terminals 34 and 36 of rectifying arrangement 8 to convert the pulsatory current into a smoothed direct output voltage available for energizing load 46. Thus, the direct voltage across load 46 is the desired output of the DC-to-DC converter.

Figure 2:
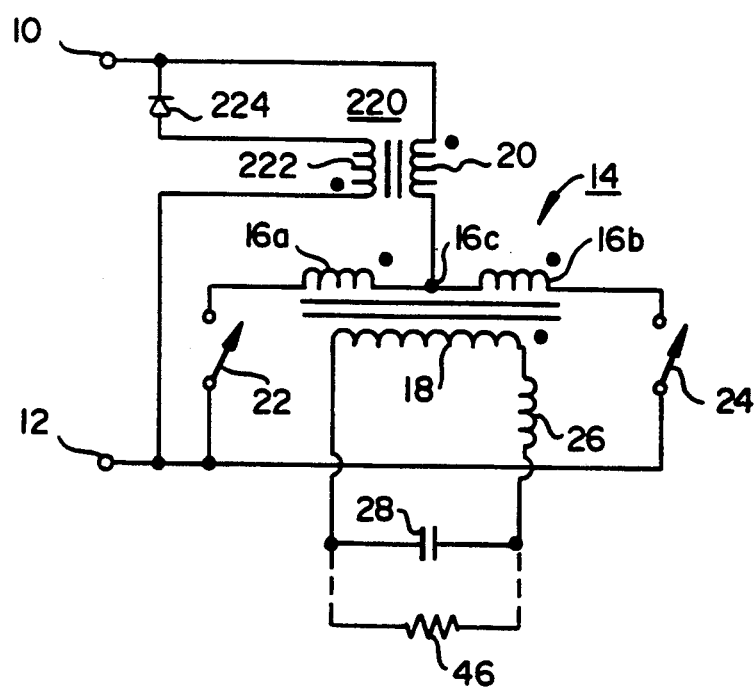
FIG. 2 is a simplified schematic diagram of an arrangement similar to that of FIG. 1, including means for returning energy to the direct voltage source during certain intervals.

FIG. 2 illustrates a modified version of the arrangement of FIG. 1. While a rectifying arrangement 8 is not illustrated in FIG. 2, it should be understood that one may be used, without significant change in the principles of operation. Elements of FIG. 2 corresponding to those of FIG. 1 are designated by like reference numerals. In FIG. 2, winding 20 is the primary winding of a transformer 220, which also includes a secondary winding 222, poled as illustrated by conventional dot notation. The inductance of winding 20 of FIG. 2 which corresponds to the inductance of inductor 20 of FIG. 1 is provided by magnetizing inductance of transformer 220 of FIG. 2. Winding 222 has its dotted end connected to pole 12 of the source of direct voltage (not illustrated), and the other end of winding 222 is connected, by the anode-cathode path of a unidirectional conducting device illustrated as a diode or rectifier 224, to pole 10. The switch capacitance is not illustrated in FIG. 2, although it is present, and may be supplemented as mentioned above.

As further described below, the arrangements of FIGS. 1 and 2 operate at variable frequency in one of two modes of operation, or at constant frequency in one of three modes of operation. In the first "50% duty cycle" mode of operation, the direct input voltage, multiplied by the secondary-to-primary turns ratio N2/N1, approximately equals the peak voltage across capacitor 28. In this mode of operation, neither boost nor buck operation is required, and the conductive or ON periods of switches 22 and 24 are of equal duration and alternate, without intervening periods in which both switches are in the same state of conduction. The operation of switches 22 and 24 of FIGS. 1 or 2 in the first mode of operation is illustrated in FIGS. 3a, b, c, and d. A full cycle of operation is represented by an interval extending from time T0 to until the next following time T0 (T0–T0). A half-cycle of operation, corresponding to the ON time of one switch, is T0–T11 or T11–T0. Those skilled in the art recognize that, even though only one full cycle of operation is illustrated, the operation is continuous during recurrent cycles.

The waveforms of FIGS. 3a through 3j represent the operation of the arrangement of FIG. 2 in the first mode of operation (50% duty cycle, neither boost nor buck), which has equal, alternating switch ON durations. As a result, at the moment one switch goes OFF (becomes nonconductive), the other goes ON (becomes conductive), and the ampere-turns in transformer 220 is essentially constant.

In FIG. 3, at times T0, switch 22 is rendered nonconductive (goes OFF) and switch 24 is rendered conductive (goes ON), so the voltage across switch 22 (V22) rises, as illustrated at time T0 by plot 322 of FIG. 3a. Plot 352 of FIG. 3b represents the current flow through switch 22 (I22) of FIG. 2. As illustrated in FIG. 3b, the current flow through switch 22 decreases to zero at time T0. Plot 324 of FIG. 3c represents the voltage across switch 24 of FIG. 2 (V24), and plot 354 of FIG. 3d represents the current through switch 24 (I24). At time T0, the ON condition of switch 24 causes voltage V24 to decrease to zero, as illustrated by plot 324 of FIG. 3c. Switch 24 carries a finite current at time T0, as illustrated by plot 354 of FIG. 3d. The current flow in switch 24 at time T0 equals the current then flowing in inductor 20, as shown by a comparison of plot 354 of FIG. 3d with plot 356 of FIG. 3e. The illustrated polarities result from the reference polarities chosen, and are somewhat arbitrary. The essentially instantaneous rise of voltage of plot 322 at time T0 assumes that the switch capacitance is small. Corresponding plot 322a of FIG. 3k represents the voltage when the switch capacitance is large, or is supplemented by an external capacitor, such as capacitor 21 of FIG. 1. The opening of switch 22 and closing of switch 24 of FIG. 2 at time T0 tends to reverse the voltage generated across secondary winding 18 of transformer 14, which tends to oppose and reverse the direction of current flow in inductor 26. The current through inductor 26 is similar to the current through primary winding 18, and is illustrated as 362 of FIG. 3h. The current flowing in inductor 26 at time T0 cannot be reversed instantaneously by the reversal of voltage across secondary winding 18. Instead, the current decays toward zero in the interval T0-T1, as illustrated by plot 362 of FIG. 3h. This reduced current results in a reduction of current in conducting switch 24, as illustrated by plot 354 of FIG. 3d in the interval T0-T1.

During the time interval T0-TI in which the current in inductor 26 of FIG. 2 is decreasing, the current reflected to primary winding 16 of transformer 14 flows from node 12 through switch 24 into which 16b, and our from center tap 16c. With switch 22 OFF, the current of inductor 26 reflected to primary winding 16 must flow through winding 20 back to source node 10. The net ampere turns of windings 20 and 222 cannot change instantaneously in the interval T0-T3, hence diode 224 becomes forward biased and conducts current, allowing a portion of the energy stored in inductor 26 to be returned to the source. The current flow through the series circuit of winding 222 and diode 224 is illustrated as plot 358 of FIG. 3f.

During time interval T1-T3, with diode 224 forward-biased, transformer 220 of FIG. 2 has essentially the direct supply voltage (minus the diode voltage drop) across its terminals, and this voltage is transformed to primary winding 20 as a function of the turns ratio of windings 20 and 222. The voltage across inductor 20 is added to the source voltage in the interval T0-T3, so the voltage at tap 16c(v16) exceeds the source voltage, as illustrated by plot 360 of FIG. 3g. The resulting high voltage at node 16 is illustrated by plot 360 of FIG. 3g. Also in the interval T1-T3, the current through inductor 26 of FIG. 2 reverses and settles toward a short-term steady-state value, as suggested by plot 362 of FIG. 3h.

At time T2, the energy previously stored in inductor 26 of FIG. 2 reaches a null as it is partially transferred back to the source by way of transformer 220, diode 224, and node 10, and partially transferred to the load 46. At time T3, inductor 26 again stores energy transferred to it by source 10 via inductor 20, windings 16c-16b of transformer 14 and switch 24. At this time, diode 224 becomes nonconductive. With diode 224 nonconductive, winding 222 is decoupled from the source, and no further voltage is coupled to inductor 20. Consequently, the voltage at tap 16c drops to the supply voltage at time T3, as illustrated by plot 360 of FIG. 3g. The voltage across open switch 22 also experiences the decrease, as illustrated at time T3 in plot 322 of FIG. 3a.

In the interval between times T3 and T11, switch 24 remains ON and switch 22 remains OFF. Switch 24 conducts a substantially constant current during this interval, as illustrated by waveform 354 of FIG. 3d. The current through switch 24 equals the current through inductor 20, which is illustrated by plot 356 of FIG. 3e. The substantially constant current through inductor 20 in the interval T3-T11 is a result of the near zero voltage drop across the inductor, and the voltage at center tap 16c is therefore substantially equal to the voltage at node 10, as illustrated by plot 360 of FIG. 3g. The substantially constant voltage across winding 16b in interval T3-T11, resulting from the substantially constant voltage at tap 16c and the ON condition of switch 24, results in a current through winding 16b and through the load 46, as illustrated by plots 362 and 366 of FIGS. 3h and 3j, respectively, and constant transformed voltage across secondary winding 18. Since the secondary voltage is constant in interval T3-T11, no current tends to flow in capacitor 28, as illustrated by plot 364 of FIG. 3i.

At time T11, switch 24 of FIG. 2 goes OFF and switch 22 goes ON. The voltage across switch 22 drops to about zero at time T11, as illustrated by plot 322 of FIG. 3a. The application of voltage across primary winding 16a again tends to reverse the voltage across secondary winding 18 of FIG. 2, and this reversed voltage tends to reduce the current in inductance 26 toward zero, and to cause a current flow in the opposite direction. The energy stored in inductance 26 resonates with capacitance 28, to cause a resonant current flow which is transformed to primary winding 16a. Switch 22 carries one-half cycle of the resonant current flow in the interval T11-T15, and at time T15 reaches a short-term stable state. Also in the interval T11-T15, energy is returned to the source by way of inductor 20, winding 222, diode 224 and node 10. This results in a voltage across inductor 20 which is added to the voltage at node 10, so that the voltage at tap 16c, and across open switch 24, is greater than the source voltage, as illustrated by plot 324 of FIG. 3c in the interval T11-T15. In the interval T15-T0, the current through secondary winding 18 and inductance 26 is in a direction opposite to the current carried in the interval T3-T11. At time T0, switch 22 goes OFF and switch 24 goes ON, and the condition of the circuit is the same as at the prior time T0, ready for another cycle of operation to begin. As described in conjunction with FIG. 3, the arrangement of FIG. 2 operates in a first mode in which switch conduction has a 50% duty cycle and alternates, without intervening periods of simultaneous conduction or nonconduction of the switches.

As mentioned, the presence of additional capacitance across switches 22 and 24, as by using high-capacitance switches or by adding additional capacitors thereacross, increases the rise times of the voltages across the switches of either FIGS. 1 or 2, as may be determined by comparing waveform 322a of FIG. 3k with waveform 322 of FIG. 3a. This also affects the switch current near the time at which the switch begins conduction, compare plot 352a of FIG. 3m in the time interval T11-T13 with the corresponding portion of plot 352 of FIG. 3b. The current in the additional capacitor, corresponding to capacitor 21 of FIG. 1, and paralleling switch 22 of FIG. 2, is illustrated as plot 368 of FIG. 3n.

The boost mode of operation of the arrangement of FIG. 2 is represented by FIGS. 4a-4k. In the boost mode of operation, the desired output voltage across capacitor 28, and therefore across secondary winding 18, is greater than the available direct input voltage applied from the external source across terminals 10 and 12, multiplied by the ratio established by the turns of secondary winding 18 divided by the turns of primary winding 16a or 16b. The waveforms of FIG. 4 result when the circuit parameters of FIG. 4 are selected in conjunction with the operating frequencies and cycle durations such that the overlap interval (T6-T12; T16-T0) represents three half-cycles of ringing of the LC network consisting of inductance 26 and capacitance 28. Also, FIGS. 4i, 4j and 4k are those encountered when a rectifier arrangement such as 8, with a smoothing capacitor such as 32, as in FIG. 1, is used.

FIG. 4a represents as a plot 422 the voltage across switch 22 of FIG. 2, with the zero-voltage condition extending from time T6 to the next following time T0, representing those times during which the switch is commanded to conduct in the boost mode, and the times T0-T6 being those in which switch 22 is controlled to a nonconductive or OFF condition. Plot 452 of FIG. 4b represents the current through switch 22 as a result of its interaction with the remainder of the circuit. During its OFF intervals T0-T6, the current flow therethrough is zero. Plot 424 of FIG. 4c represents the voltage across switch 24 of FIG. 2 during operation in the boost mode. As illustrated, the conductive period extends from time T0 to time T12, and the nonconductive period extends from time T12 to the next following time T0. The current flow through switch 24 is represented by plot 454 of FIG. 4d. During the interval T6-T12, both switches 22 and 24 are conductive, as indicated by the zero-voltage portions of plots 422 and 424 during that period.

The conduction of both switches 22 and 24 of FIG. 2 in the time interval T6-T12, as illustrated in FIG. 4, short-circuits primary winding 16, which causes the impedance of the winding to drop to near zero. Plot 460 of FIG. 4g illustrates the voltage at tap 16c. As a result of the short-circuiting, center tap 16c is effectively connected to pole 12 by way of short-circuited windings 16a and 16b, and ON switches 22 and 24. Winding 20 effectively has impressed thereacross during time interval T6-T12 the full direct input voltage (i.e. the voltage applied from an external source across poles 10 and 12). This in turn causes an increase in the current magnitude through winding 20 during the interval T6-T12, as illustrated by plot 456 of FIG. 4e. The current through winding 20 continues to increase, and additional energy continues to be stored in its inductance, until time T12.

At time T12, switch 24 is controlled to a nonconducting state, whereupon primary winding 16 is no longer short-circuited. When switch 24 goes OFF at time T12, the energy stored in the inductance associated with winding 20 acts to reverse and increase the winding voltage in an "inductive buck" to attempt to maintain the current flow, as is well known in the art, but the current cannot increase instantaneously in primary winding 16a by virtue of the inductance of inductor 26. As is also known in the art, the energy associated with winding 20 produces a voltage across winding 222 of transformer 220 which forward-biases diode 224, and some of the energy of winding 20 is returned to the source of direct voltage coupled to poles 10 and 12. Most of the excess energy, however, is manifested as a voltage across primary winding 16a during the following interval T12-T0, which voltage is greater than the source voltage. As a result, the direct voltage applied to primary winding 16a is "boosted" after time T12 by the energy stored in winding 20 during that period T6-T12 in which both switches 22 and 24 conduct. As a result of the boosted voltage across winding 16a during interval T12-T16, a relatively larger transformed voltage is induced in secondary winding 18.

The current through secondary winding 18 of FIGS. 1 or 2 is illustrated by plot 462 of FIG. 4h. Plot 464 of FIG. 4i represents the current flow through capacitor 28 of FIG. 2. As mentioned above, capacitor 28 may in practice be the inter-winding capacitance of the transformer, and inductor 26 may be leakage inductance, and as a result the current illustrated as plot 464 in FIG. 4i may occur in a distributed manner within transformer 14, and may not be accessible for measurement. Therefore, that portion of the transformer current represented by plot 462 of FIG. 4h which flows through capacitor 28, namely current 464 of FIG. 4i, is not available for application to load 46. Instead, only the relatively flat current portions represented by plot 462 in the intervals T0-T6 and T12-T16 are directly available to the load. It should also be noted that the resonances illustrated in plot 464 of FIG. 4i are damped when a smoothing capacitor 32 is not used. When a smoothing capacitor 32 is present, the load current is constant, as represented by plot 466 of FIG. 4j. Consequently, capacitor 32 supplies the load current during intervals T6-T12 and T16-T0, and is replenished during intervals T0-T4 and T12-T14, as illustrated by plot 468 of FIG. 4k.

Thus, the boost mode occurs when switches 22 and 24 are caused to conduct simultaneously. By virtue of the resonant action of inductor 26 and capacitor 28 of FIGS. 1 and 2, the rise and fall times of the voltage and current waveforms are increased or slowed, resulting in lower power losses, and therefore higher efficiency, than in prior art arrangements without such resonances.

The circuits of FIGS. 1 and 2 enter the boost mode from the symmetrical mode as soon as even a slight amount of simultaneous switch conduction is commanded. The amount of boost depends upon the relative duration of the period of simultaneous conduction, so that, if the transformed output voltage tends to drop, or if the input direct voltage tends to decrease, a proportionate response may be made by a controller (described below).

It may be, however, that the transformed output voltage is too high, or the direct input voltage is excessive, in which case a buck mode of operation may be desired. As a generality, in the buck mode of operation, the current flowing in inductor 26 of FIGS. 1 or 2, reflected to primary winding 16 of transformer 14, encounters an open-circuit if both ideal switches 22 and 24 are simultaneously OFF. Practical switches have inherent interelectrode capacitance, as described above. The interelectrode capacitance allows current to flow in primary winding 16 in a resonant manner when the ideal switch is OFF, and makes the third or buck mode possible in the arrangement of FIGS. 1 and 2. However, the interelectrode capacitance alone may be insufficient to allow a wide range of operation, i.e. large buck voltages and/or wide control frequency may not be possible. Additional supplemental capacitors such as 21 and 23 of FIG. 1 may increase the range of operation, but tend to result in increased losses during operation (turn-ON or turn-OFF) of the switches, which may be undesirable. Waveforms for the buck mode of operation of the arrangement of FIGS. 1 or 2 are similar to those described below in conjunction with FIG. 9.

Figure 5:
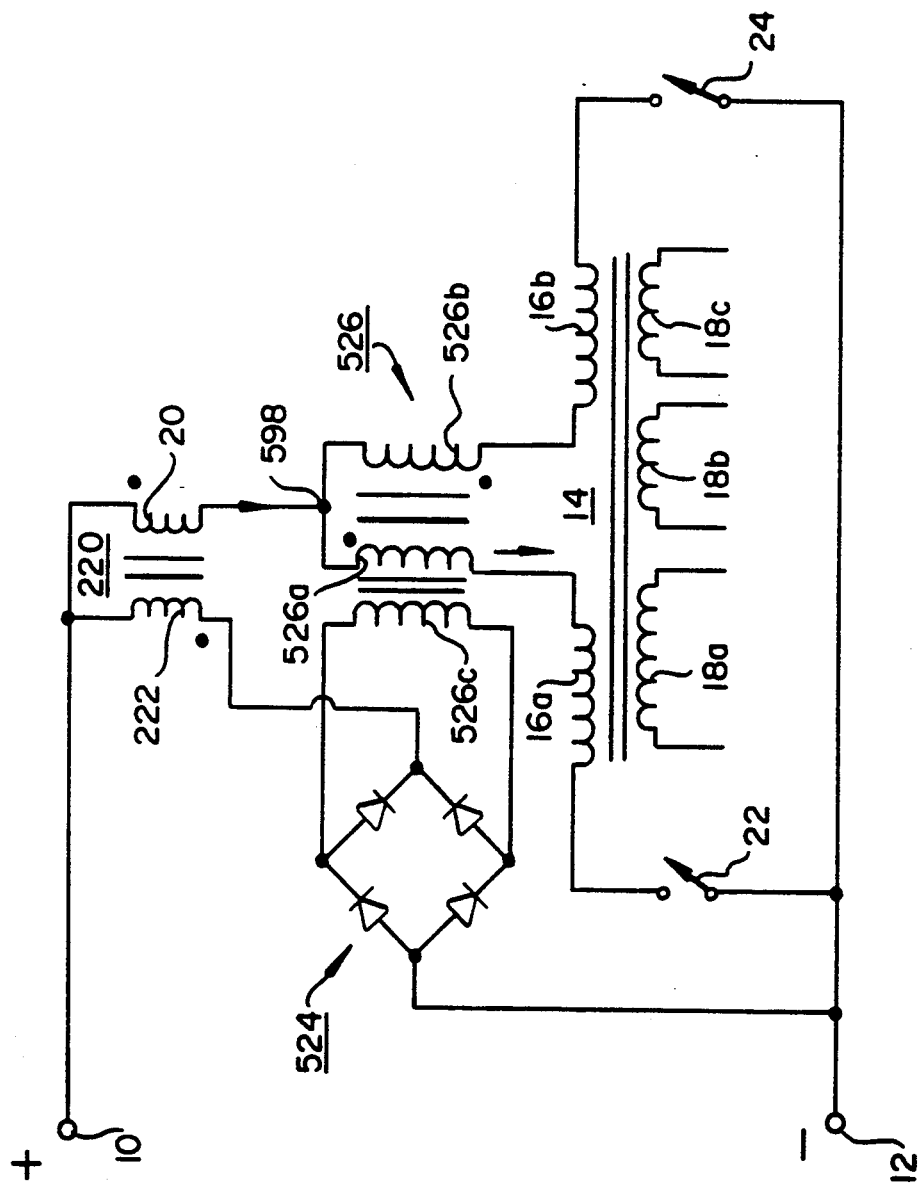
FIG. 5 is a simplified schematic diagram of another embodiment of the invention.

FIG. 5 shows another embodiment of the invention. Elements of FIG. 5 which correspond to those of FIGS. 1 or 2 are designated by like reference numerals. In FIG. 5, transformer 14 is wound in known manner for reducing its magnetizing inductance, represented as 26 in FIGS. 1 and 2. Thus, the arrangement of FIG. 5 has little inductance in series with its secondary windings 18. An equivalent inductance is coupled to primary windings 16a and 16b in the form of a coupled inductor set 526 including windings 526a, 526b, and 526c; the windings are coupled as in a transformer but each winding acts as an inductance, and the core is gapped to prevent saturation. A node 598 is equivalent to center tap 16c for some purposes. If current flows from inductor 20 to node 598, divides and flows equally through windings 526a and 526b, their winding polarization, indicated by dots, is such that the magnetic fields cancel, and the inductance effectively becomes zero. However, if current flows only in winding 526a or 526b, or if there is a difference in the current magnitude, or if circulating currents flow in both 526a and 526b, the inductance is not canceled as to the difference. Winding 526c is arranged to return energy back to the source by way of a bridge rectifier 524. The direction of winding of winding 526c doesn't matter, because the bridge rectifier will couple winding 526c to the source regardless of the polarity of the voltage. When either switch 22 or 24 opens, the energy stored in coupled inductor set 526 causes current flow through winding 526c, bridge rectifier 524, and winding 222 back to the source. At such times, the voltage impressed across winding 526c is the source voltage, minus the drop across the rectifier and the voltage across winding 222. This limitation on the maximum voltage across winding 526c limits the voltage across coupled windings 526a and 526b, and thereby limits the voltage appearing across switches 22 or 24 at turn-OFF.

Figure 6:
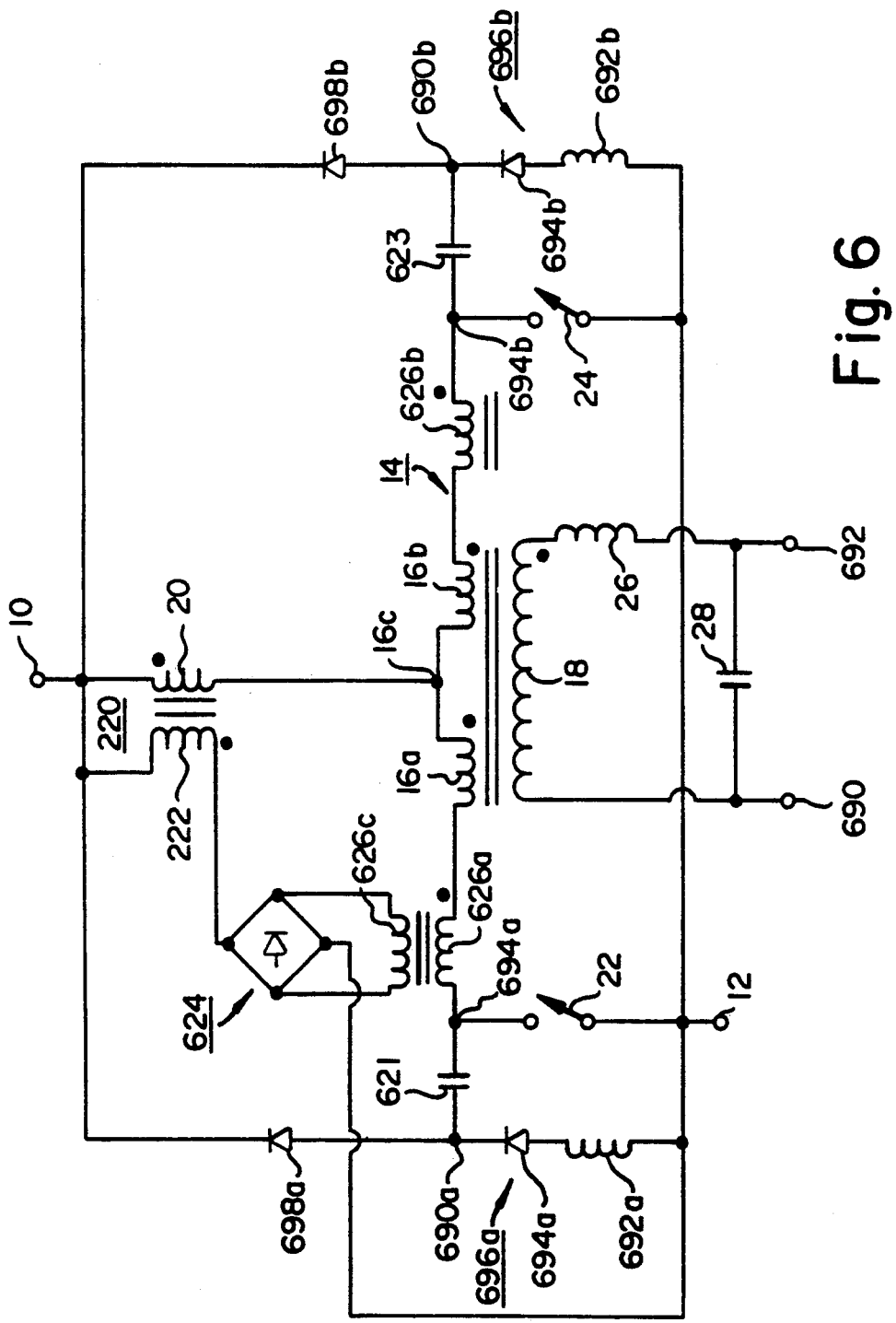
FIG. 6 illustrates in simplified schematic form a further embodiment of the invention.

Elements of FIG. 6 corresponding to those of FIGS. 1 and 2 are designated by like reference numerals. In FIG. 6, inductor 626, consisting of windings 626a, 626b and 626c wound on a common core, has an effect equivalent to that of inductor 526 shown in FIG. 5. In FIG. 6, inductors 626a and 626b are connected between primary winding 16a and a node 694a adjacent switch 22, and between primary winding 16b and a node 694b adjacent switch 24, respectively. A snubber 696a including the series combination of an inductor 692a and the anode-to-cathode conductive path of a diode 694a is connected between node 12 and a node 690a. A similar snubber 696b including a like series combination of an inductor 692b and the anode-to-cathode path of a diode 694b is connected between node 12 and another node 690b. A capacitor 621 couples node 690a to node 694a, and a capacitor 623 couples node 690b to node 694b. The anode-to-cathode paths of diodes 698a and 698b couple nodes 690a and 690b, respectively, to node 10.

As mentioned, transformer 14 may be wound so that inductance 26 and/or capacitance 28 is relatively small, so as to be negligible, or they may be significant. Thus, these elements may or may not be present, as desired. Also, a rectifier arrangement (not illustrated in FIG. 6) may be coupled to terminals 690 and 692 of the arrangement of FIG. 6 for rectifying the alternating voltage to generate direct voltage for application to a load.

In operation, the arrangement of FIG. 6 may function in any one, or all of, a first (50% duty cycle) mode, a second (boost) mode, and a third (buck) mode. The plots of FIG. 7 represent the 50% duty cycle mode, those of FIG. 8 represent operation in the boost mode, and those of FIG. 9 represent the buck mode. In general, in the boost mode the voltage at node 16c is boosted above that of the 50% duty cycle mode during portions of the cycle, to thereby increase the voltage coupled to the secondary winding, and in the buck mode the voltage at node 16c is reduced below that occurring in the 50% duty cycle mode to thereby decrease the voltage coupled to the secondary winding. The boosting is accomplished by periods of simultaneous conduction of switches 22 and 24, which effectively increases the current through inductor 20, and bucking is accomplished by periods of simultaneous nonconduction of the switches, which tends to reduce the current in inductor 20.

FIG. 7 relates to 50% duty cycle operation during recurrent cycles of operation extending from time T0 to next following time T0. Just before time T0, switch 22 is conductive or ON, switch 24 is nonconductive or OFF, and current flows from node 10 through inductor 20, primary winding 16a, inductor 626a, and switch 22 to node 12 (ground or zero voltage reference). Switch 24 of FIG. 6 is turned ON at time T0 and remains ON until time T20, and its voltage drops during this interval, as illustrated by plot 724 of FIG. 7c in the interval T0-T20. Switch 22 goes OFF at time T0, and remains OFF until time T20, as illustrated by the finite voltages of plot 722 of FIG. 7a in this interval. At time T20, switch 24 goes OFF, as illustrated by the increase of voltage in plot 724 in the interval T20-T0, and switch 22 goes ON, as indicated by the low voltage of plot 722 of FIG. 7a during T20-T0. During their ON intervals, switches 22 and 24 carry a substantially constant current, as illustrated by plots 752 and 754, respectively, of FIGS. 7b and 7d.

The current through inductor 20 is substantially constant during the entire cycle, as illustrated by plot 756 of FIG. 7e. Since a direct voltage cannot be impressed across an inductor without a change in current therethrough, the voltage at node 16c remains near the node 10 voltage. Plot 760 of FIG. 7g illustrates the voltage at node 16c and shows the effects of stray and circuit resonances near switching times T0 and T20. At time T0, when switch 22 goes OFF and switch 24 goes ON, current cannot immediately cease to flow in inductor 626a, and its current flows in a resonant half-cycle through capacitor 621 and diode 698a back to node 10. The current flow through capacitor 621 charges its plate adjacent node 694a to a high positive voltage. The second half-cycle of resonance cannot occur, because diode 698a becomes reverse-biased, and the plate of capacitor 621 adjacent node 690a is therefore left at the node 10 voltage. Plot 774 of FIG. 7m represents the voltage across capacitor 621. In the following interval extending until time T20, current through inductor 20, primary winding 16b, inductor 626b, and switch 24 causes a voltage across secondary winding 18, illustrated as plot 770 of FIG. 7j, which causes a secondary current to flow, as illustrated by plot 762 of FIG. 7h.

At time T20, midway between times T0, switch 22 of FIG. 6 becomes conductive, and switch 24 becomes nonconductive. When switch 22 goes ON, the voltage across capacitor 621 (plot 774 of FIG. 7m) causes a resonant half-cycle of current to flow through capacitor 621, switch 22, and through inductor 692a and diode 694a of snubber 696a. The resonant current is illustrated as plot 772 of FIG. 7k. Charge is transferred from plate 694a to the plate adjacent node 690a, with the result that the voltage across capacitor 621 is reversed in the interval T20-T28, as indicated in FIG. 7m. Thus, the current in switch 22 rises after time T20, but the current does not come from inductor 626a, but rather from capacitor 621, resonating with inductor 692a. The current in inductor 626a builds up more slowly. Also in the interval immediately following time T20, the current then flowing in inductor 626b flows through, and charges capacitor 623, and flows through diode 698b back to node 10. Capacitor 623 remains charged when the following half-cycle of the resonance is blocked by diode 698b. Current pulses in capacitor 28 (if present) associated with inductance 26 and the reversal of the secondary voltage are illustrated by plot 764 of FIG. 7i. The desired alternating output voltage appearing across capacitor 28 is illustrated as 770 of FIG. 7j. The alternating voltage, as mentioned, may be applied to a rectifier arrangement for conversion to direct voltage. No significant current flows through winding 222 of transformer 220 in the 50% duty cycle mode, as illustrated by waveform 758 of FIG. 7f.

In the boost mode of the arrangement of FIG. 6, the operation of which is illustrated by the waveforms of FIG. 8, each switch 22 and 24 turns on earlier than T0 or than intermediate time T50, and turns OFF later, to create an overlap interval during which both switches 22 and 24 conduct. The overlap interval of switches 22 and 24 is illustrated by plots 822 of FIG. 8a and 824 of FIG. 8c, in which the overlap conduction intervals are T44-T56 and T64-T36, bracketed by heavy arrows associated with FIGS. 8b and 8c. During those intervals, primary windings 16a and 16b, and coupled inductors 626a and 626b, have equal and opposite currents therein, and tend to assume a low-impedance state. As a result, inductor 20 is effectively connected across nodes 10 and 12 and is impressed with the full source voltage. As a result, the current through inductor 20 rises in the overlap intervals T64-T36 and T44-T56, as illustrated by plot 856 of FIG. 8e.

Just before time T36, switches 22 and 24 of FIG. 6 are closed or ON, and increasing current flows through inductor 20 because the voltage at node 16c is near zero. Both capacitors 621 and 623 are charged, with nodes 690a and 690b positive with respect to nodes 694a and 694b, respectively. The current flowing in inductor 20 at time T36 divides evenly between primary windings 16a and 16b. A circulating current flows through capacitor 28 and secondary winding 18, which causes a current flow in a loop including primary windings 16a and 16b, inductors 626a and 626b, and switches 22 and 24, which is manifested as a resonant current portion illustrated in plot 864 of FIG. 8i, as well as in switch current plots 852 of FIG. 8b and 854 of FIG. 8d.

At time T36, switch 22 of FIG. 6 goes OFF. Current continues to flow through inductor 626a, capacitor 621 and diode 698a back to node 10. Since capacitor 621 was previously charged to the full supply voltage, the voltage across switch 22 is held down by capacitor 621 and does not rise immediately. Instead, the voltage across switch 22 increases slowly in the time following time T36 as illustrated by waveform 822 of FIG. 8a in the interval T36-T38, as inductor 626a transfers energy to the capacitor. The voltage at node 16c rises from zero to a peak value following time T36, as illustrated by plot 860 of FIG. 8g, as the current flow through inductor 20 encounters a finite impedance.

In the interval T36-T44, switch 22 of FIG. 6 remains OFF, and switch 24 remains ON, so current flows through inductor 20, primary winding 16b, inductor 626b, and switch 24 to node 12. This current flow causes a proportionate current to flow in winding 18 for application to load, illustrated as plot 862 of FIG. 8h.

In the interval T36-T38, the level to which the voltage across switch 22 of FIG. 6 rises depends upon the various currents and upon components values, as well as the source voltage. The voltage at node 16c responds to the voltage across switch 22 because of the action of winding 16a and 16b of transformer 14, being configured somewhat as an autotransformer by virtue of the ON state of switch 24 and the application of current to node 16c. Under certain conditions, the voltage rise at node 16c attributable to the voltage across switch 22 may be sufficient to raise the voltage across windings 222 and 626c sufficiently to forward-bias bridge rectifier 624, to thereby return energy to the source. The current flow under this condition in winding 222 is illustrated in plot 858 of FIG. 8f. The current flow in winding 222 in turn reduces the current through inductor 20 so as to maintain the ampere-turns of transformer 220 constant. This results in a notch, illustrated as 857, in the current plot 858 of FIG. 8e. Also near time T38, the current flowing in winding 626c similarly reduces the current in winding 626b, thereby reducing the rate of charge of capacitor 621, and as a result limits the peak voltage across switch 22. This limitation of peak voltage is manifested as a rounding of the peak value 823 of the waveform of plot 822 of FIG. 8a.

In the interval T38-T44, the voltage at node 16c of FIG. 6 is higher than that at node 10, as inductor 20 releases energy gained during previous interval T64-T36, and this release is manifested as a decrease in inductor current, illustrated in plot 856 of FIG. 8e, and is also manifested as an increase in node 16c voltage at over the voltage which it would otherwise have. The voltage at node 16c is illustrated as plot 860 of FIG. 8g. At time T44, switch 22 goes ON. Switch 24 is already ON at time T44, and remains on until later time T56. As a result, a period of simultaneous switch conduction occurs, primary winding 16a and 16b is again short-circuited, and its impedance drops. This again impresses the full source voltage across inductor 20, causing the current therethrough to rise, as illustrated by plot 856 of FIG. 8e, as increasing total energy is stored in the inductor in preparation for another cycle of operation.

At time 44, with switch 22 of FIG. 6 closed, the voltage across capacitor 621 forward-biases diode 694a, while diode 698a remains reverse-biased. A resonant circuit is formed including capacitor 621 and inductor 692a of snubber 696a. The resonant circuit goes through one-half cycle of resonance. Plot 872 of FIG. 8k illustrates the current through snubber 696a. This half-cycle of resonance has the effect of reversing the voltage across capacitor 621, as illustrated by plot 874 of FIG. 8m in the interval T44-T50. The voltage across capacitor 621 at the beginning of the half-cycle of resonance may be larger than the source voltage then existing between nodes 10 and 12. As the above-mentioned voltage reversal proceeds, the voltage at node 690a of FIG. 6 may tend to rise above the voltage of node 10, whereupon diode 698a conducts and clamps the capacitor voltage to the source voltage. A "blip" 853 on plot 852 of FIG. 8b is a result of the half-cycle of snubber current 872 of FIG. 8h.

In the interval T44-T56, capacitor 28 of FIG. 6 (if present) discharges through secondary winding 18, and recharges in the opposite polarity, as illustrated by plot 870 of FIG. 8j. A portion of a resonant cycle of current flow through capacitor 28 is illustrated as plot 864 of FIG. 8i, and the resulting voltage change is illustrated by plot 870 of FIG. 8j. The resonant current flow in capacitor 28 is coupled to transformer primary windings 16a and 16b, and results in resonant portions of current flow through switch 22, illustrated in plot 852 of FIG. 8b just preceding time T56. The resonance is due to capacitance 28 and inductors 26, 626a and 626b, forming a series-LC resonant network.

At time T56 of FIG. 7, switch 24 of FIG. 6 goes OFF while switch 22 remains ON. The half-cycle extending from T56 to T64 will correspond to that described for the interval T36-T44, and no further description is necessary.

The result of boost mode operation is to generate an alternating voltage at output terminals 690 and 692 which is greater than that which occurs in the 50% duty cycle mode of operation.

It should be noted that FIGS. 8a-8m relate to an overlap duration coinciding with one-half period of oscillation of capacitor 28 of FIG. 6 with inductor 26, and with other elements such as inductor 626. The half-period of oscillation is illustrated as plot 864 in FIG. 8i. A continuous range of overlap durations is possible, ranging from zero to approximately 15% of the overall cycle duration, or more. The amount of overlap affects the waveforms, as for example waveform 870 of FIG. 8j could have 1¼ cycles of oscillation in the interval T44-T56 rather than ½ cycle as shown. This does not affect the overall operation of the converter.

In the buck mode of operation of the arrangement of FIG. 6, the operation of which is explained in conjunction with FIGS. 9a-9m, periods of conduction of switches 22 and 24 are separated by OFF or dead periods, bracketed by heavy arrows associated with FIGS. 9b, in which neither switch conducts. This tends to reduce the current through inductor 20 in a manner which reduces the transformed secondary voltage below that which would be transformed in the 50% duty cycle mode.

Before time T0 in the buck mode, switch 22 of FIG. 6 is ON, as indicated by the finite magnitude of switch current illustrated by plot 952 in FIG. 9b, and switch 24 is OFF. Increasing current flows through inductor 20, coupled inductor 626a, primary winding 16a, and switch 22. Capacitor 621 is charged with node 690a positive relative to node 694a, and capacitor 623 holds node 694b positive with respect to node 690b. Conventional current flows out of the dotted end of winding 18, through inductor 26 and the load. Terminal 692 is positive with respect to terminal 690.

At time T0 in the buck mode, switch 22 of FIG. 6 goes OFF, and switch 24 remains nonconductive, as illustrated by plots 922 and 924 of FIGS. 9a and 9c, respectively. The voltage across switch 22 rises from zero after time T0 as capacitor 621 is charged by the current flowing in inductors 20 (plot 956 of FIG. 9e) and 626a, and also by current arising from the energy represented by current flow through inductor 26 (if present), coupled through transformer 14. The voltage across switch 22 reaches a peak, illustrated as 921 in FIG. 9a, at time T70. The voltage across switch 24, illustrated as plot 924 of FIG. 9c, will also tend to rise in the interval T0-T70 as the current in inductor 20, 956 of FIG. 9e, begins to divide into two paths, and to flow through winding 16b as well as winding 16a. That portion of the current flowing in winding 16b tends to increase the charge on capacitor 623 as the current flows through diode 698b back to node 10.

Also in the interval T0-T70, as the voltage at node 694a of FIG. 6 rises due to the charging of capacitor 621, the voltage at node 16c also rises, as illustrated by plot 960 of FIG. 9g. The rise in voltage at node 16c toward the voltage at node 10 decreases the voltage across inductor 20. Further increase in the voltage at node 16c above the voltage at node 10 reverses the voltage across inductor 20, and then increases that reversed voltage. This results in an increased voltage across winding 222, by virtue of transformer action. The increased voltage across winding 222, added to the voltage across winding 526c, forward-biases bridge rectifier 624 and causes conduction, in the interval T0-T76 which returns energy to the source as shown by plot 958 of FIG. 9f. The current in inductor 20 decreases as the current in winding 222 increases, for reasons described above. The current in inductor 20 is reduced to zero for the interval T70 to T76 due to the current through winding 222. In this fashion, a portion of the energy stored in inductor 20 is transferred by winding 222 to the source in the interval T0-T76. During the interval T70-T74, the voltage across capacitor 28 of FIG. 6 (if present) decreases toward zero in a sinusoidal half-cycle, as illustrated in plot 970 of FIG. 9j. This causes a current in winding 16b which charges capacitor 623, causing an increase, illustrated as 923 in FIG. 9c, in the voltage across switch 24.

The resonance of capacitor 28 of FIG. 6 (if present) with its associated inductors in the interval T0-T76 causes resonant currents to flow through various paths, bypassing the nonconductive switches. Such a path might include snubber 696a, capacitor 621, inductors 626a and 626b, primary windings 16a and 16b, capacitor 623, and diode 698b. The voltage across capacitor 28 is illustrated by plot 970 of FIG. 9j. The resonant currents cause a resonant peak in the voltage across nonconductive switch 22, as illustrated by 921 in FIG. 9a, and a similar resonance across switch 24, as illustrated by 923 of FIG. 9c, and also cause other resonant effects. The current flow through secondary winding 18, illustrated as plot 962 of FIG. 9h, shows the resonant effects.

At time T76 of FIG. 9, switch 24 of FIG. 6 goes ON, while switch 22 remains OFF. Capacitor 623 discharges through switch 24 and snubber 696b, creating a resonant current through switch 24 which is illustrated as 925 in FIG. 9d. Also at time T76, current begins to flow through inductor 20, as illustrated by plot 956 of FIG. 9e, and through primary winding 16b to inductor 626b, and through switch 24 to node 12.

At time T76, inductor 20 has its lowest non-zero current and therefore its lowest energy. From time T76 through time T86, switch 24 remains conductive, and energy is transferred to the load. The current through inductor 20 increases because the voltage at node 16c is less than the voltage at node 10 and additional energy is stored in the magnetic fields associated with inductor 20 during this interval. During switch conduction, the voltage at node 16c is lower than at node 10 because during the time when both switches are OFF, it is higher and the average over a full cycle T0-T0 must be effectively equal to the source voltage.

In the interval T76-T77 of FIG. 9, following turn ON of switch 24, the voltage across secondary winding 18 rises slowly as capacitor 28 charges. The voltage across capacitor 28 is illustrated as plot 970 of FIG. 9j. In the interval T76-T78, the reduction in voltage across switch 24 is communicated to switch 22 through transformer 14, and this may cause snubber 696a to conduct, as illustrated by plot 975 of FIG. 9k, to partially discharge capacitor 621 to the new voltage.

At time T86 of FIG. 9, switch 24 of FIG. 6 goes OFF, and switch 22 remains OFF. The voltage across switch 24 rises gradually from zero, as the current previously flowing through switch 24 is diverted to flow through capacitor 623 and diode 698b, first discharging the capacitor, and then recharging it in the opposite polarity. As the voltage of switch 24 rises toward a maximum value, as explained in conjunction with switch 22, the voltage increases at node 16c, as well as across switch 22. This causes capacitor 621 to take on additional charge and a higher voltage, as illustrated after time T86 in plot 974 of FIG. 9m.

The operation of the arrangement of FIG. 6 in the interval T86–T92 corresponds to that in the interval T0 and T76, and will be understood from the discussion above.

Coupled inductors 626a and 626b of FIG. 6 are connected in series with primary windings 16a and 16b, respectively, of transformer 14. It makes little difference to the operation of the arrangement of FIG. 6 if coupled inductors 626a and 626b are on the center-tap sides of the primary windings, rather than on the sides remote from center tap 16c, although the waveforms during operation will appear somewhat different from those illustrated in FIG. 7, 8 and 9. When connected in this fashion, coupled windings 626a and 626b take on the general appearance of windings 546a and 526b of FIG. 5. The equivalence of these different connections is clear, and the equivalence of the magnetically coupled windings 526c and 626c is also clear. Indeed, either or both sets of inductors 526, 626 may be used. Also, in the arrangement of FIG. 6 inductors 626a and 626b may be uncoupled, in which case operation is essentially the same as that described, but greater peak voltage may appear across switches 22 and 24.

The efficiency of the described converters is high in part because the switches, at turn-ON, have zero or low current flows, as illustrated, for example, by the current through switch 22 at time T92 of FIG. 9b. As illustrated in FIG. 9b, the current appears to rise instantly, but this is due to the scale of the FIGURE. In actuality, the current in switch 22 is attributable to resonant effects which start at zero current, because the current can only come from inductors 692a and/or 626a of FIG. 6, both of which are at essentially zero current at turn-ON. At turn-OFF of switch 22, the voltage across the switch is held near zero by capacitor 621 and the conduction of diode 698a for a time sufficient to allow the switch to become fully nonconductive. The product of switch voltage multiplied by switch current is therefore low during both turn-ON and turn-OFF, for low power dissipation in the switch and consequent high efficiency of the circuit.

In the context in which a rectifier arrangement is coupled to capacitor 28, the characteristics of the converter offer further efficiency advantages. In particular, the output voltage is filtered by capacitor 28, inductor 26 and inductors 626, so that reversals of voltage across the rectifier arrangement occur slowly, which allows time for rectifier recovery from the conducting condition before significant reverse voltages are applied, thereby reducing losses attributable to turn-ON and turn-OFF of the rectifier arrangement.

The description of the operation of the arrangement of FIG. 6 in conjunction with FIGS. 7, 8 and 9 has referred to cycle times T0–T0. A preferred mode of operation is the constant-frequency mode, in which the times T0–T0 illustrated in FIGS. 7, 8 and 9 are of equal duration among the 50% duty cycle, boost and buck modes. However, it is also possible to operate with a variable frequency, which may be accomplished by, for example, fixing the ON durations of switches 22 and 24, and varying the operating frequency to change the total cycle time. This may be understood by considering a frequency at which the fixed ON periods of switches 22 and 24 are contiguous, i.e. switching of conduction from one switch to the other occurs essentially simultaneously. If the frequency is lowered, the cycle time becomes longer, whereby the two fixed durations of conduction of the switches, together, are less than the total cycle time; there must therefore be periods of time in which both switches are OFF, corresponding to the buck operating mode. On the other hand, if the frequency is raised from the 50% duty cycle condition, with fixed ON durations, the cycle time becomes shorter, and overlapping conduction periods must occur, corresponding to the boost mode. Of course, the normal operating point may be in either the boost or buck modes, with a range of operation which is limited to that mode, without excursions to the 50% duty cycle or to the other mode.

The arrangement of FIG. 6 may be modified by deletion of winding 222 of transformer 220, winding 626c of coupled inductor set 626, and rectifier 624. It may also be modified, by connection of a coupled inductor 526 as was previously show in FIG. 6. Either inductor 626 or 526 or both with or without winding 526a, 626c and rectified 526 and 624 may be a part of the circuit of FIG. 6.

Figure 10:
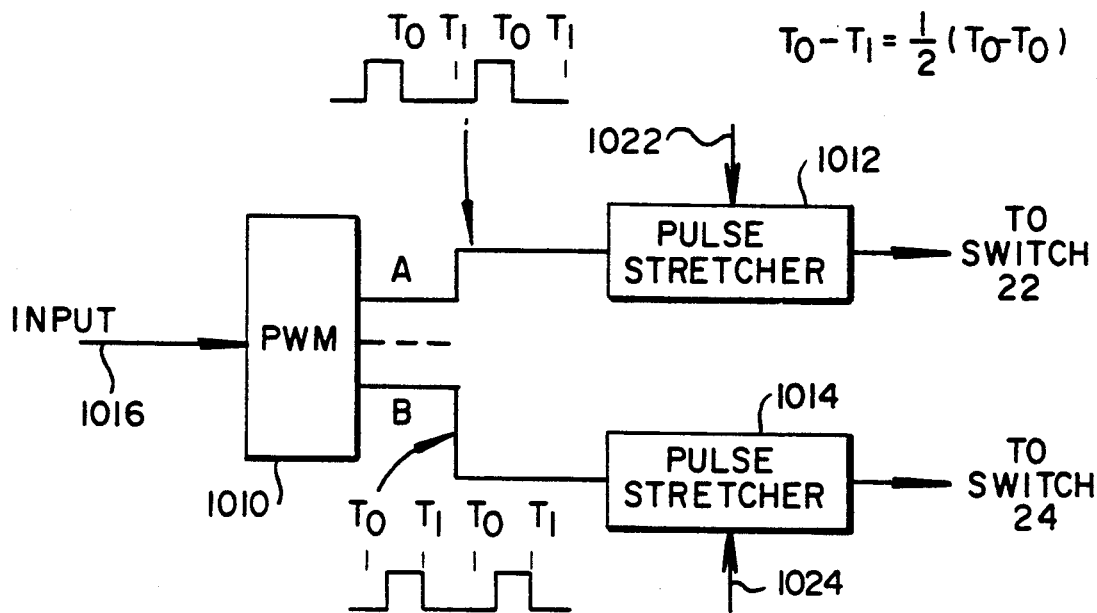
FIG. 10 is a simplified block diagram of a control arrangement adapted for controlling the switches of the arrangements of FIGS. 1, 3, 5, or 6 in accordance with the invention.

FIG. 10 illustrates a simple controller which may be used for control of switches 22 and 24 in fixed-frequency operation. In FIG. 10, a Pulse Width Modulator (PWM) circuit 1010 such as found in integrated circuits types 1524, 1525 or 1526 manufactured by Silicon General, (Garden Grove, Calif.) provides two output signals A and B having variable pulse ON times in response to a control signal applied to the input terminal 1016. The output signals A and B are identical except they are shifted in time with respect to each other by one half cycle, i.e.: one half of the time interval T0-T0. The A and B pulses are applied separately to pulse stretchers 1012 and 1014, which could be as simple as a pair of falling-edge triggered one-shot multivibrators and/or diode logic "OR" circuit for adding each one shot's output to the corresponding output of the PWM. Pulse stretchers 1012 and 1014 may be controlled by their inherent component values or by control signals applied to their control inputs 1022, 1024, respectively. In an embodiment of the invention operating at a pulse repetition frequency of about 50 kHz (cycle duration 20 μs, half-cycle 10 μs), each pulse stretcher provided about a 10% stretch (1 μs out of 10 μs). Many sophisticated methods for producing gating signals for power-supply switches are known and may be used.

In particular, a closed-loop feedback system may be used, as is well known in the art, in which the output voltage (or current) of the controlled structure (the inverter or converter of FIGS. 1, 2, 5 or 6) is sensed and compared with a reference voltage (or current) to produce an error signal, and the error signal is applied degeneratively for control of the operating frequency or for control of the ON duration in the fixed-frequency mode, as by application to input terminal 1016 of PWM 1010 of FIG. 10. The duration of the pulse stretching may also be controlled by another loop sensing changes in the source voltage and coupling the changes, appropriately modified, to pulse stretcher control inputs 1022 and 1024, making it possible to achieve a feed-forward or adaptive control scheme. Details of such feedback control are within ordinary skill in the art, and are not elaborated further.

Figure 11A:
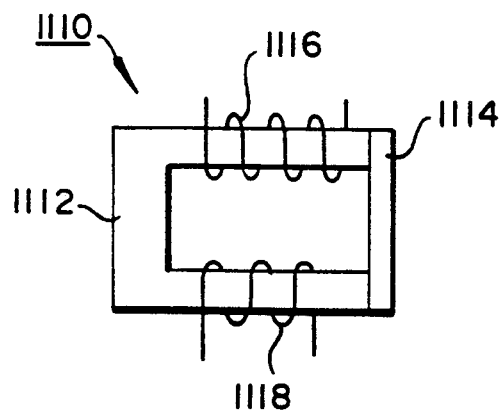
FIGS. 11a and 11b are elevation views of transformers with U-I cores, with windings arranged to provide leakage inductance.
Figure 11C:
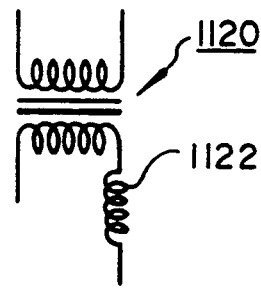
FIG. 11c illustrates an equivalent circuit.
Figure 11B:
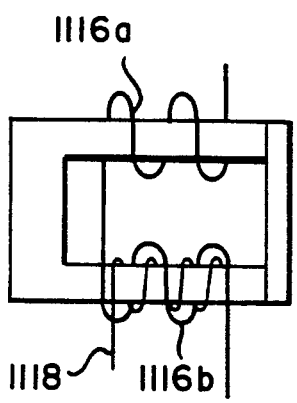

FIG. 11a illustrates a transformer 1110 with magnetic U-core 1112 and end I-piece 1114. A primary winding 1116 is wound on a first leg of the core, and a secondary winding 1118 is wound on the other. Such a structure is less tightly coupled than a transformer in which both primary and secondary windings are wound on the same leg, and as a result has a significant amount of leakage inductance. FIG. 11c is a schematic representation of the structure of FIG. 11a. In FIG. 11c, an ideal transformer 1120 represents the coupling between windings 1116 and 1118, and an inductor 1122 represents the leakage inductance. The amount of leakage inductance can be controlled by winding a portion of the primary winding on the same leg as the secondary winding, as illustrated by primary winding portions 1116a and 1116b of FIG. 11b.

Other embodiments of the invention will be apparent to those skilled in the art. In particular, separate inductors may be wound on the same core, as for example inductors 626a and 626b of FIG. 6 may be wound either separately or preferably on the same core, as that their alternate conduction adjusts the magnetization so a smaller core is needed than if separate cores were used. U-U magnetic cores may be used instead of U-I cores in the arrangement of FIG. 11, and other winding configurations providing leakage inductance are possible, such as winding a portion of the secondary winding on the same leg of the core as the primary winding, or winding portions of both primary and secondary windings on each of two legs of the core.

What is claimed is:

1. A power converter for converting, to an alternating current, the direct voltage from a source of direct voltage including first and second poles across which said direct voltage is generated, comprising:

a first transformer means including a primary winding and a secondary winding, said primary winding including first and second portions and a center tap coupled therebetween, said primary winding being magnetically coupled to said secondary winding;

first inductance means coupled to said center tap and to said first pole of said source of direct voltage;

first and second controllable switch means coupled to ends of said first and second portions of said primary winding, respectively, remote from said first inductance means, and also coupled to said second pole of said source of direct voltage for, when said first switch means is conductive and said second switch means is nonconductive, allowing current flow through said first inductance means and said first portion of said primary winding of said first transformer means, and for, when said second switch means is conductive and said first switch means is nonconductive, allowing current flow through said first inductance means and said second portion of said primary winding of said first transformer means, and for, when both said first and second switch means are conductive, short-circuiting said primary winding to thereby impose said direct voltage across said first inductance means, and for, when both said first and second switch means are nonconductive, removing energizing voltage from said first inductance means; and control means coupled to said switch means for cyclically operating said switch means in at least one of first, second and third modes of operation, each of said first, second and third modes of operation providing a conductive period and a nonconductive period during each cycle of operation for each of said first and second switch means, (a) said conductive and nonconductive periods being of equal duration in said first mode of operation, whereby said first and second switch means alternate conduction, and current flow continuously through said first inductance means, and the alternating voltage produced across said secondary winding is in a particular amplitude relationship with said direct voltage, (b) said conductive periods being of greater duration than said nonconductive periods in said second mode of operation, whereby periods of conduction of each of said first and second switch means alternate with periods of simultaneous conduction of both said first and second switch means, which short-circuits said primary winding to thereby tend to increase current flow through said first inductance means, and said alternating voltage produced across said secondary winding has a greater amplitude relative to said direct voltage than that provided by said particular relationship; and (c) said nonconductive periods being of greater duration than said conductive periods in said third mode of operation, whereby periods of conduction of each of said first and second switch means alternate with periods of nonconduction of both said first and second switch means, which open-circuit said primary winding to thereby tend to decrease current flow through said first inductance means, and said alternating voltage produced across said secondary winding has a lesser amplitude relative to said direct voltage than that provided by said particular relationship.

2. A converter according to claim 1, further comprising capacitance means serially coupled with second inductance means to form a series circuit, said series circuit being coupled across said secondary winding.

3. A converter according to claim 2 further comprising rectifying means coupled across said capacitance means for rectifying said alternating voltage to produce a direct output voltage.

4. A converter according to claim 2 wherein at least one of said capacitance means and said second inductance means is an inherent reactance of said first transformer means.

5. A converter according to claim 4 wherein said second inductance means is provided by leakage inductance of said first transformer means.

6. A converter according to claim 3 wherein said rectifying means comprises bridge rectifying means.

7. A converter according to claim 1 further comprising first and second capacitance means coupled across said first and second switch means, respectively.

8. A converter according to claim 1 further comprising:

a further winding coupled to said first inductance means;

unidirectional conductive means serially coupled with said further winding to form a clamping circuit; and means for coupling said clamping circuit across said source of direct voltage whereby energy stored in said first inductance means may be returned to said source of direct voltage during those periods in which both said first and second switch means are nonconductive in said third mode of operation.

9. A converter according to claim 5 wherein said first transformer means comprises a core including first and second magnetic legs, with one of said primary and secondary windings wound on said first leg, and with the other of said primary and secondary winding wound at least partially on said second leg.

10. A converter according to claim 1, further comprising second and third inductance means connected to said center tap and also serially connected with said first and second portions, respectively, of said primary winding of said first transformer means.

11. A converter according to claim 10 wherein said second and third inductance means are magnetically coupled.

12. A converter according to claim 11, further comprising a third winding magnetically coupled with said second and third inductance means.

13. A converter according to claim 12, further comprising rectifying means coupled to said third winding.

14. A converter according to claim 13 further comprising a fourth winding transformer-coupled with said first inductance means.

15. A converter according to claim 14, further comprising means for coupling said fourth winding and said rectifying means across said source of direct voltage.

16. A converter according to claim 1, wherein said first inductance means comprises a primary winding of second transformer means.

17. A converter according to claim 16, wherein said second transformer means comprises a secondary winding.

18. A converter according to claim 17, further comprising rectifying means coupling said secondary winding of said second transformer means across said source of direct voltage.

19. A converter according to claim 18, further comprising second and third inductance means serially coupled with said first and second portions, respectively, of said primary winding of said first transformer means.

20. A converter according to claim 19, further comprising:
first capacitance means coupled to said first switch means and to said second inductance means, respectively, for receiving current from said second inductance means during at least some intervals in which said first switch means is open;
first unidirectional current conducting means coupled to said first capacitance means and to said source of direct voltage for allowing one-half cycle of resonance of said first capacitance means with at least said second inductance means;
second capacitance means; and
second unidirectional current conducting means coupled to said second capacitance means and to said source of direct voltage for allowing one-half cycle of resonance of said second capacitance means with at least said third inductance means.

21. A converter according to claim 20, further comprising snubbing means coupled to said first capacitance means and to said first switch means, said snubbing means including fourth inductance means serially coupled with third unidirectional current conducting means, for, when said first switch means makes a transition from the OFF state to the ON state with a charge then existing on said first capacitance means, forming a resonant circuit including said fourth inductance means and said first capacitance means.

22. A power converter for converting, to an alternating current, the direct voltage from a source of direct voltage including first and second poles across which said direct voltage is generated, comprising:
first transformer means including a primary winding and a secondary winding, said primary winding including first and second portions connected together at a center tap, said primary winding being magnetically coupled to said secondary winding;
first inductance means coupled to said center tap and to said first pole of said source of direct voltage, said first inductance means including a first winding of second transformer means, said second transformer means further including a second winding magnetically coupled with said first winding of said second transformer means;
second and third inductance means serially coupled with said first and second portions, respectively, of said primary winding of said first transformer means, to thereby form first and second series circuits, respectively;
first and second controllable switch means coupled at first and second nodes, respectively, to ends of said first and second series circuits, respectively, remote from said center tap, and also coupled to said second pole of said source of direct voltage for, when said first switch means is conductive and said second switch means is nonconductive, allowing current flow through said first inductance means, said first portion of said primary winding of said first transformer means, and said second inductance means, and for, when said second switch means is conductive and said first switch means is nonconductive, allowing current to flow through said first inductance means, said second portion of said primary winding of said first transformer means, and said third inductance means, and for, when both said first and second switch means are conductive, short-circuiting said primary winding to thereby reduce the impedance of said primary winding and increase the voltage across said first inductance means, and for, when both said first and second switch means are nonconductive, reducing the voltage across said first inductance means;
a third winding magnetically associated with said second and third inductance means;
first rectifying means coupled with said second winding of said second transformer means and with said third winding magnetically associated with said second and third inductance means for adding the absolute value of the voltage across said third winding to the voltage across said second winding to produce a sum voltage, and for clamping said sum voltage to said direct voltage of said source when said sum voltage attempts to significantly exceed said direct voltage;
first and second capacitance means, said first capacitance means having a first end coupled to said first node, and also having a second end defining a third node, said second capacitance means having a first end coupled to said second node, and also having a second end defining a fourth node;

second and third rectifying means coupled to said third and fourth nodes, respectively, and to said first pole of said source of direct voltage, said second and third rectifying means being poled to conduct in response to current flow through said second and third inductance means, respectively, immediately after said first and second switch means, respectively, make a transition from a conducting to a nonconducting state;

first and second snubbing means, said first snubbing means comprising fourth inductance means serially coupled with fourth rectifying means, and said second snubbing means comprising fifth inductance means serially coupled with fifth rectifying means, said first and second snubbing means being coupled between said third and fourth nodes, respectively, and said second pole of said source of direct voltage, with said fourth and fifth rectifying means poled to conduct in response to voltage across said first and second capacitance means, respectively, when said first and second switch means, respectively, make a transition from the nonconducting state to the conducting state; and control means coupled to said first and second switch means for cyclically operating said switch means in at least one of first, second and third modes of operation, each of said first, second and third modes of operation including a conductive period and a nonconductive period for each of said first and second switch means during each cycle of operation, (a) said conductive and nonconductive periods being of equal duration in said first mode of operation, whereby said first and second switch means alternate conduction, and current flows continuously through said first inductance means, and the alternating voltage produced across said secondary winding is in a particular amplitude relationship relative to said direct voltage, (b) said conductive periods being of greater duration than said nonconductive periods in said second mode of operation, whereby periods of conduction of each of said first and second switch means alternate with periods of conduction of both said first and second switch means which short-circuit said primary winding to thereby tend to increase current flow through said first inductance means, and said alternating voltage produced across said secondary winding has a greater amplitude relative to said direct voltage than that provided by said particular relationship; and (c) said nonconductive periods being of greater duration than said conductive periods in said third mode of operation, whereby periods of conduction of each of said first and second switch means alternate with periods of nonconduction of both said first and second switch means which open-circuit said primary winding to thereby tend to decrease current flow through said first inductance means, and said alternating voltage produced across said secondary winding has a lesser amplitude relative to said direct voltage than that provided by said particular relationship.

23. A converter according to claim 22, further comprising:
capacitance means serially coupled with sixth inductance means to form a series circuit coupled across said secondary winding.

24. A converter according to claim 22, wherein said first rectifying means comprises bridge rectifying means.

25. A converter according to claim 24, wherein:
said second winding associated with said first inductance means defines first and second ends;
said bridge rectifying means comprises a first pair of terminals coupled to said third winding, magnetically associated with said second and third inductance means and also comprises a second pair of terminals, one of which is coupled to one pole of said source of direct voltage, and the other of which is connected to said first end of said second winding associated with said third inductance means; and
means coupling the other pole of said source of direct voltage to said second end of said second winding associated with said first inductance means.

26. A converter according to claim 22, wherein said control means comprises:
pulse width modulating means including first and second output terminals, for generating first and second time-alternate pulse sequences at said first and second output terminals, respectively; and
pulse duration modulating means coupled to said pulse width modulating means and to said first and second switch means, for further modulating the duration of said pulses of said first and second pulse sequences for controlling said switch means in said one of said first, second and third modes of operation.

* * * * *